(12) United States Patent
Humlicek et al.

(10) Patent No.: US 6,594,744 B1
(45) Date of Patent: Jul. 15, 2003

(54) MANAGING A SNAPSHOT VOLUME OR ONE OR MORE CHECKPOINT VOLUMES WITH MULTIPLE POINT-IN-TIME IMAGES IN A SINGLE REPOSITORY

(75) Inventors: Donald R. Humlicek, Wichita, KS (US); Rodney A. DeKoning, Augusta, KS (US); William P. Delaney, Wichita, KS (US)

(73) Assignee: LSI Logic Corporation, Milpitas, CA (US)

( * ) Notice: Subject to any disclaimer, the term of this patent is extended or adjusted under 35 U.S.C. 154(b) by 310 days.

(21) Appl. No.: 09/735,175

(22) Filed: Dec. 11, 2000

(51) Int. Cl.[7] .......................... G06F 12/16; G06F 11/16
(52) U.S. Cl. .......................... 711/162; 711/161; 714/6; 714/766; 707/202; 707/203; 707/204
(58) Field of Search ................................ 711/161, 162; 707/202, 203, 204; 714/1, 5, 6, 34, 766

(56) References Cited

U.S. PATENT DOCUMENTS

| 5,481,694 | A | * | 1/1996 | Chao et al. ................. 711/112 |
| 5,664,186 | A | | 9/1997 | Bennett et al. |
| 6,081,875 | A | * | 6/2000 | Clifton et al. .............. 711/162 |
| 6,119,131 | A | | 9/2000 | Cabrera et al. |
| 6,119,208 | A | * | 9/2000 | White et al. ................ 711/162 |
| 6,182,198 | B1 | * | 1/2001 | Hubis et al. ................ 711/162 |
| 6,212,531 | B1 | * | 4/2001 | Blea et al. .................. 707/204 |
| 6,237,008 | B1 | | 5/2001 | Beal et al. |
| 6,338,123 | B2 | | 1/2002 | Joseph et al. |
| 6,366,988 | B1 | | 4/2002 | Skiba et al. |
| 6,374,268 | B1 | | 4/2002 | Testardi |
| 6,434,681 | B1 | * | 8/2002 | Armangau ................... 711/162 |

FOREIGN PATENT DOCUMENTS

| EP | 1148416 | * | 10/2001 |
| GB | 2272549 | * | 5/1994 |
| WO | WO 98/48347 | * | 10/1998 |
| WO | WO 99/63441 | * | 12/1999 |

* cited by examiner

Primary Examiner—B. James Peikari
(74) Attorney, Agent, or Firm—John R. Ley, LLC

(57) ABSTRACT

In a storage system, such as a storage area network, a snapshot volume or one or more checkpoint volumes are formed from the same base volume using a single repository containing multiple images of data stored in the base volume. The first image is started with the formation of the snapshot volume or the first checkpoint volume and is filled with blocks of data copied from the base volume, thereby increasing in size within the repository, until the first image is stopped and the next image is started. The next image is then filled with blocks of data copied from the base volume until stopped. Thus, the blocks of data are copied only into the most recently created image within the repository. With the creation of each checkpoint volume, a new image is concurrently started in the same repository. Each checkpoint volume is dependent on the image that was created concurrently plus any images created thereafter.

13 Claims, 14 Drawing Sheets

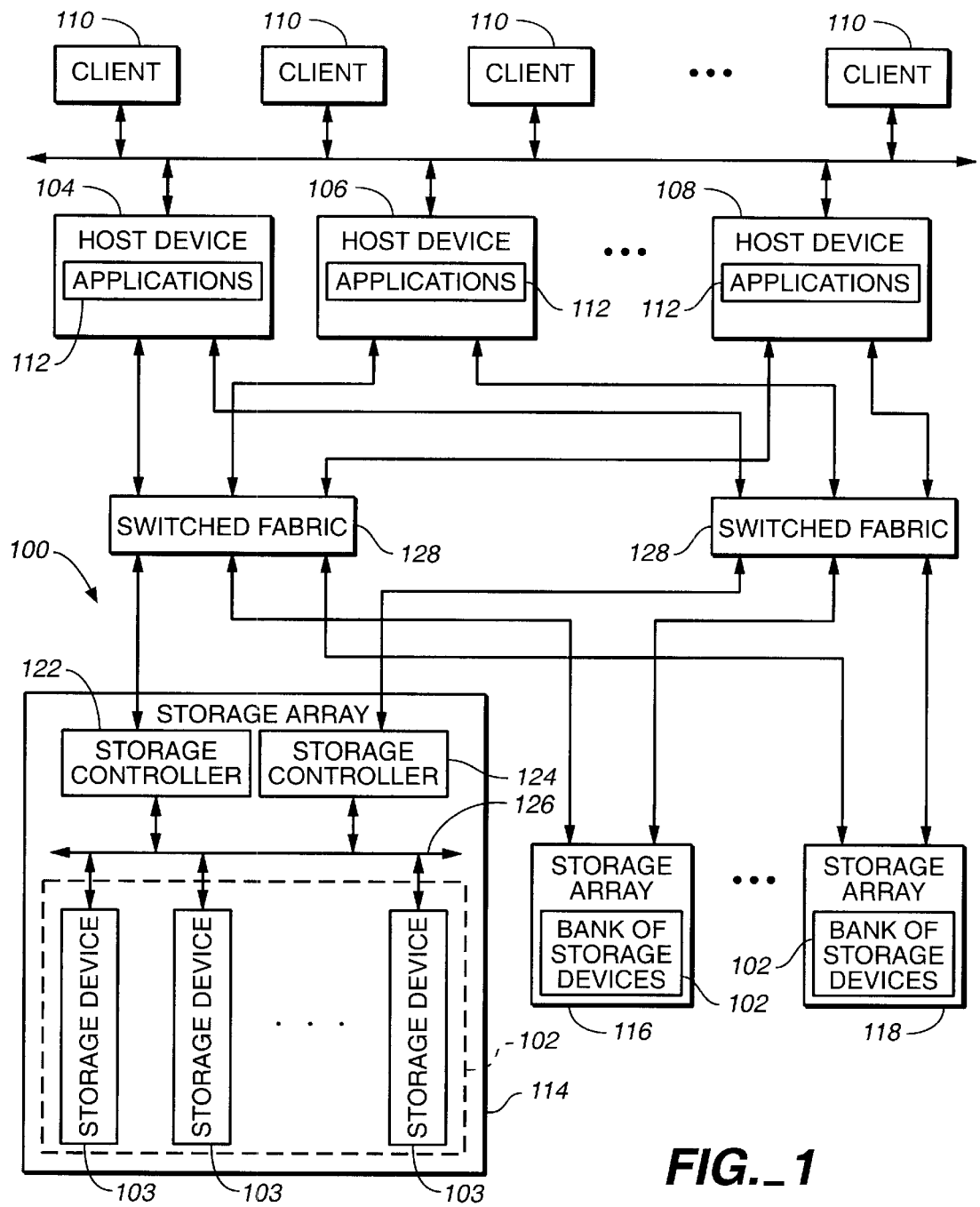
FIG._1

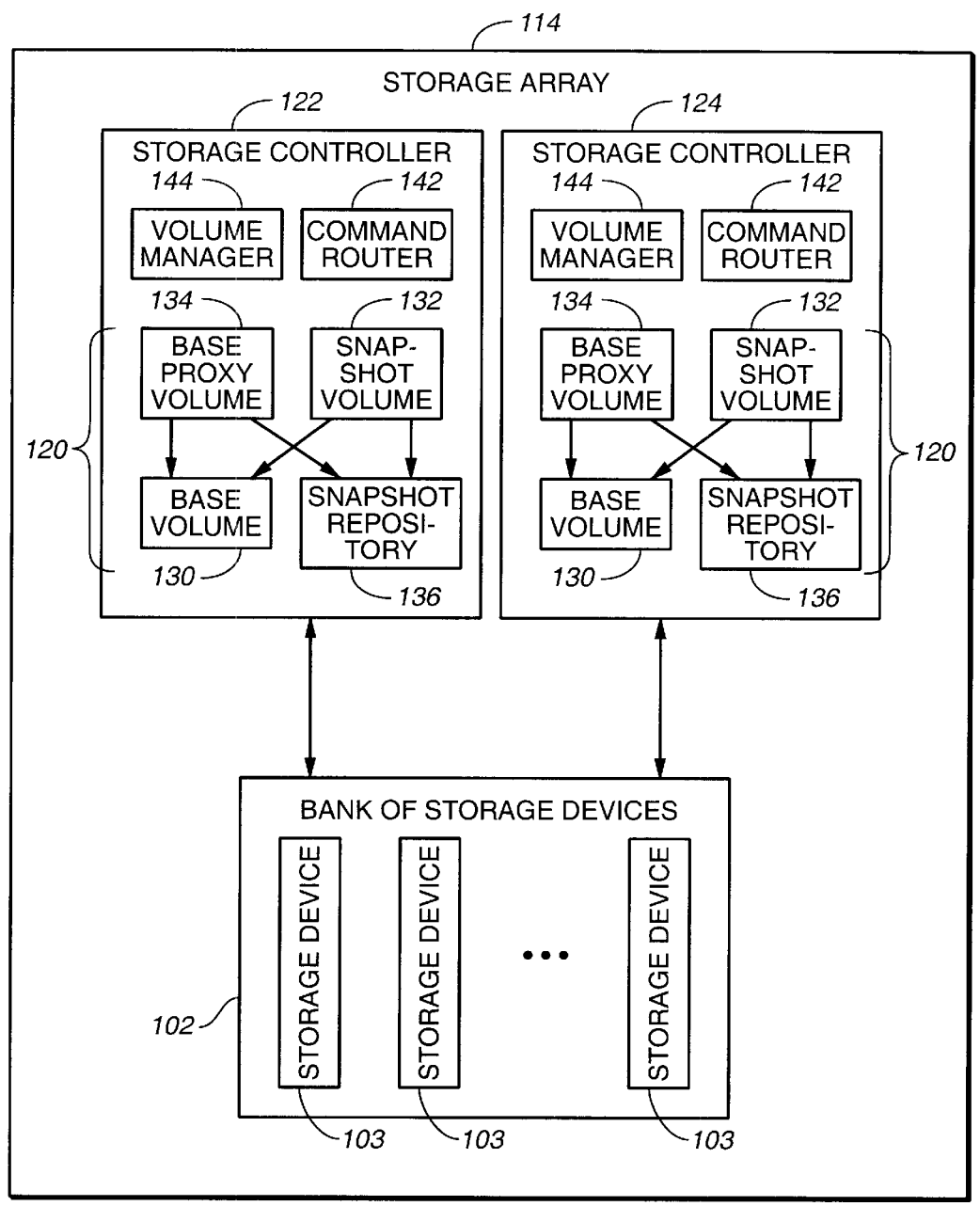
FIG._2

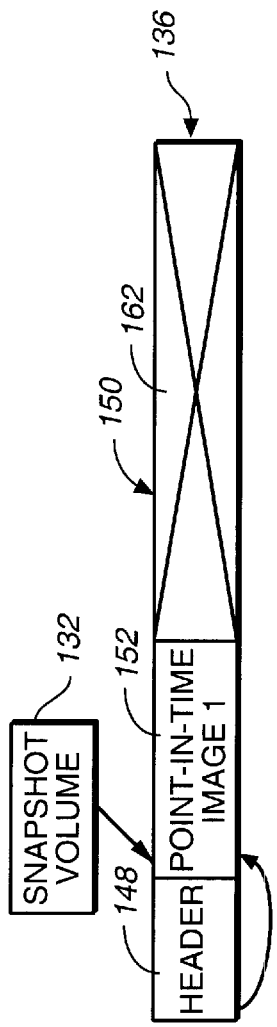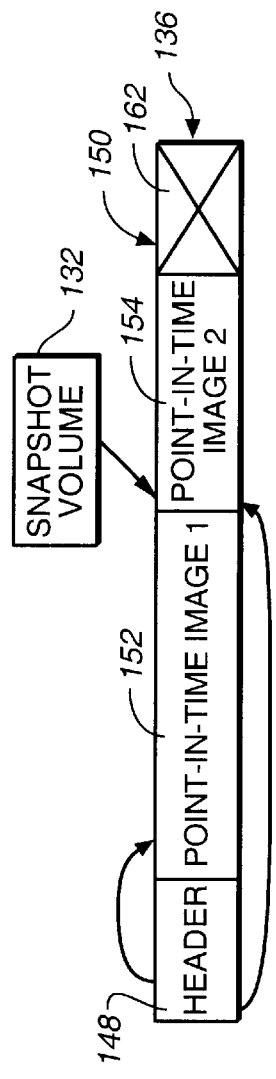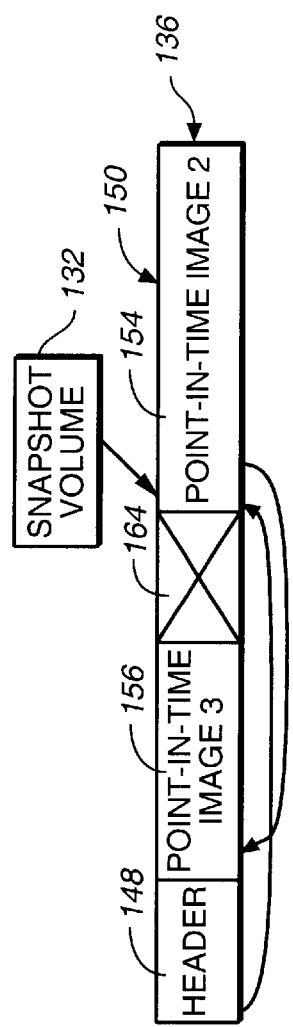
FIG._3  FIG._4  FIG._5

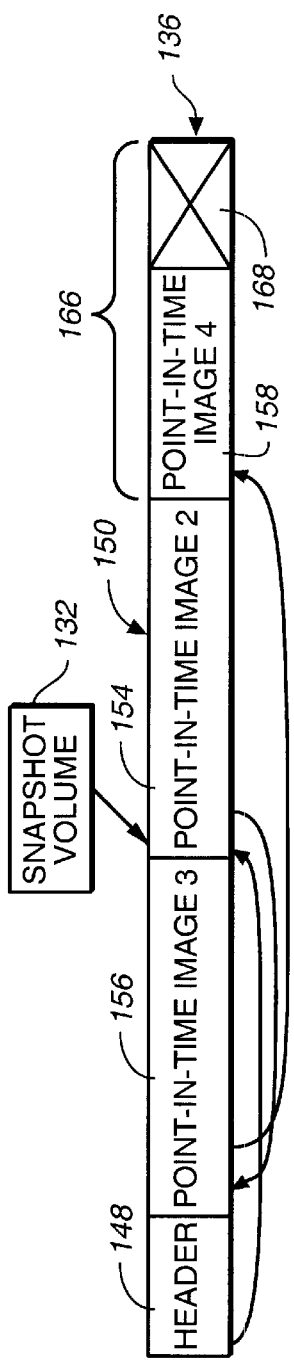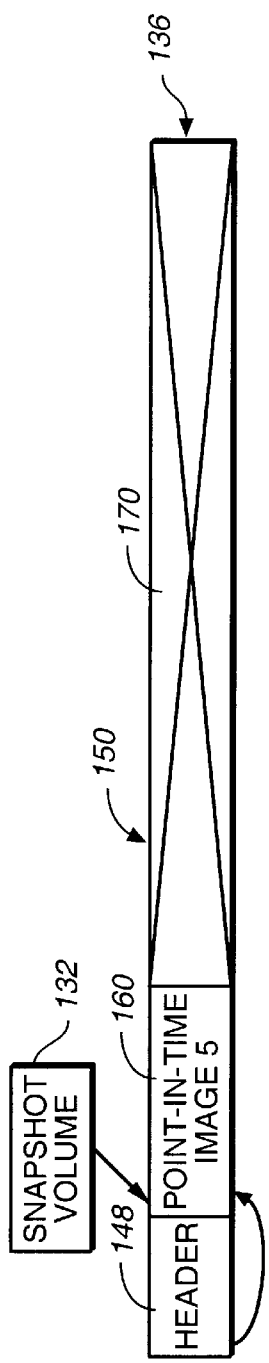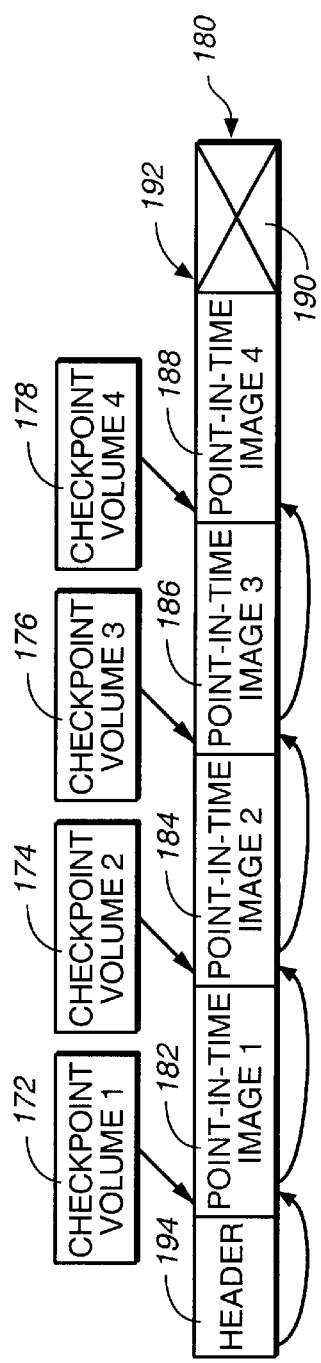

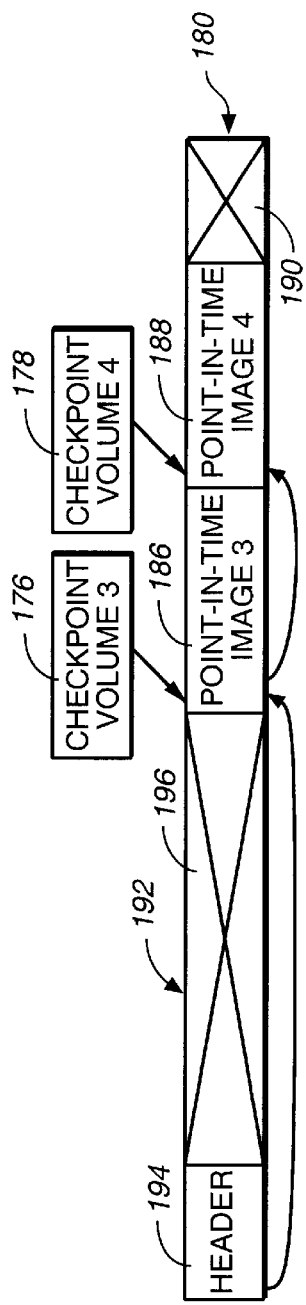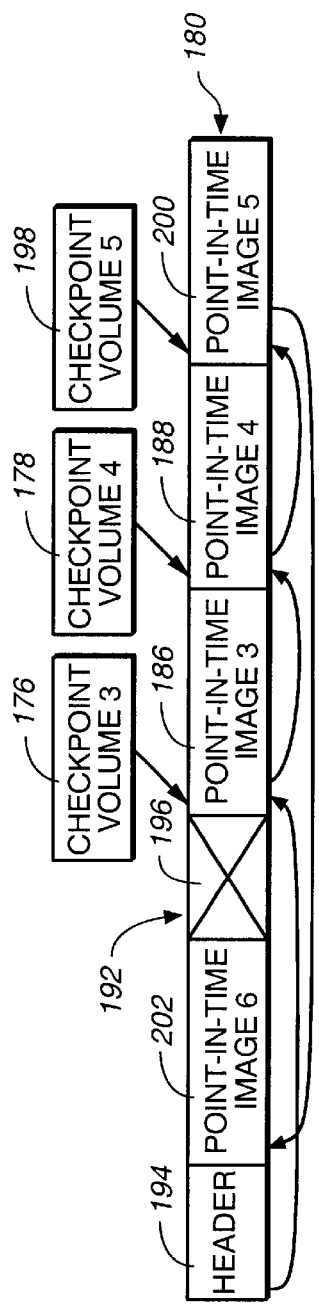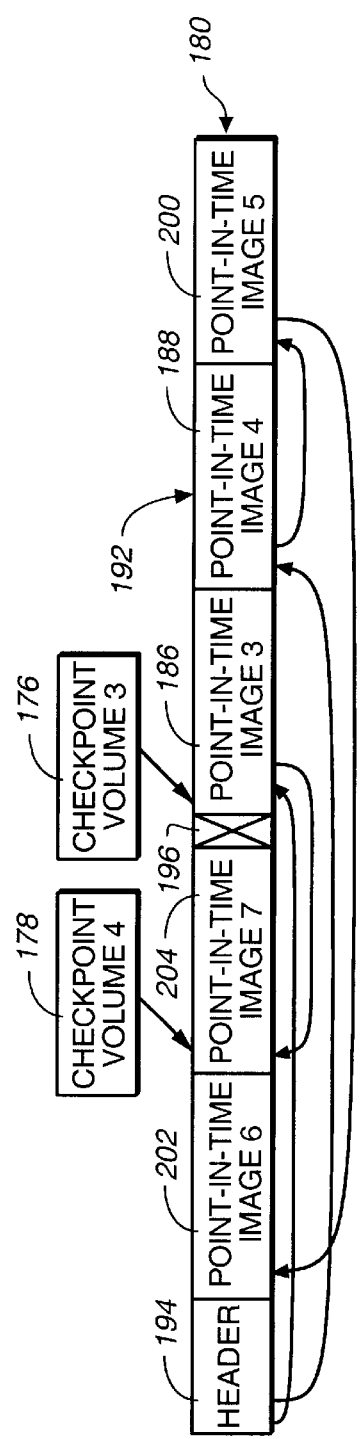
FIG._9   FIG._10   FIG._11

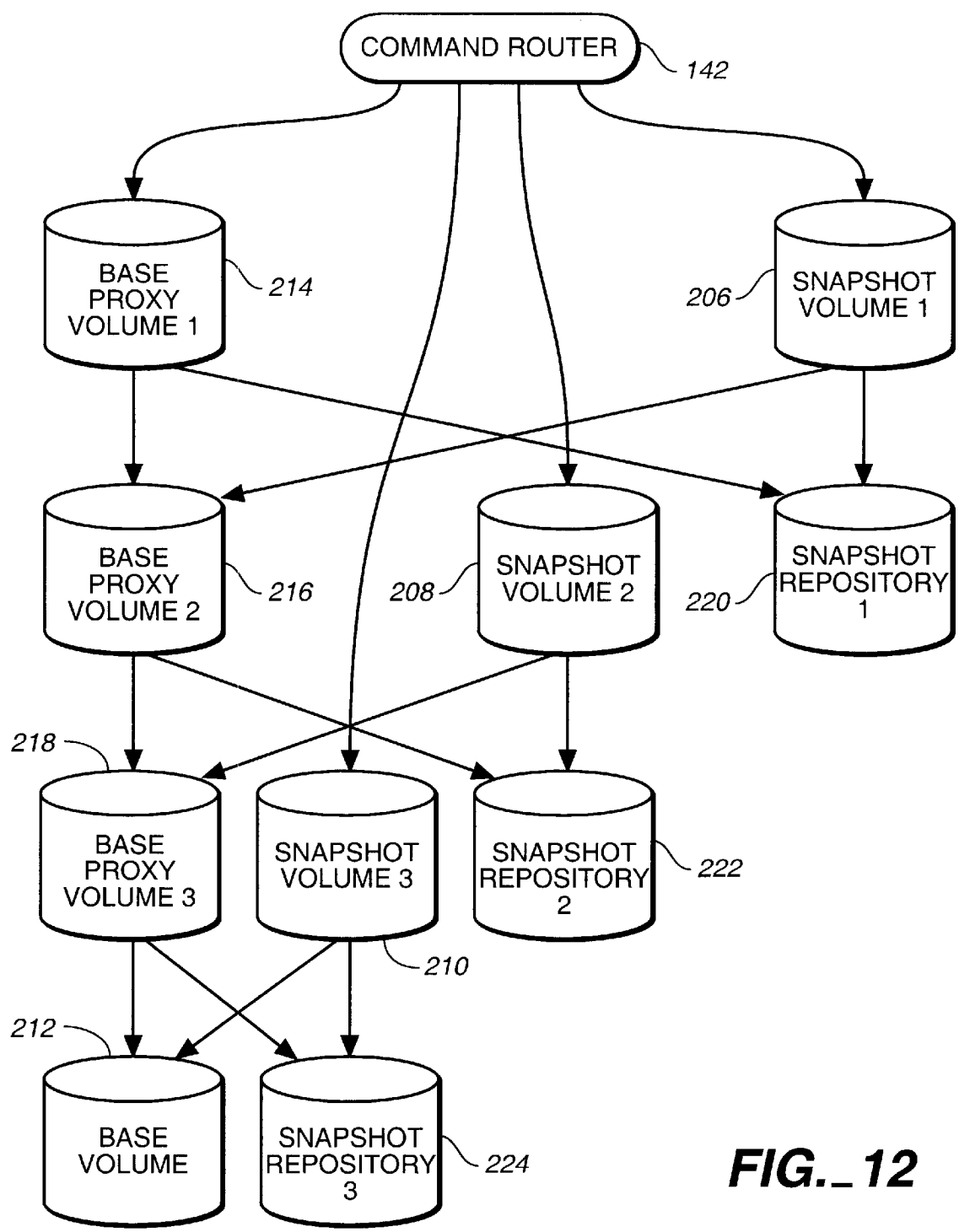
FIG._12

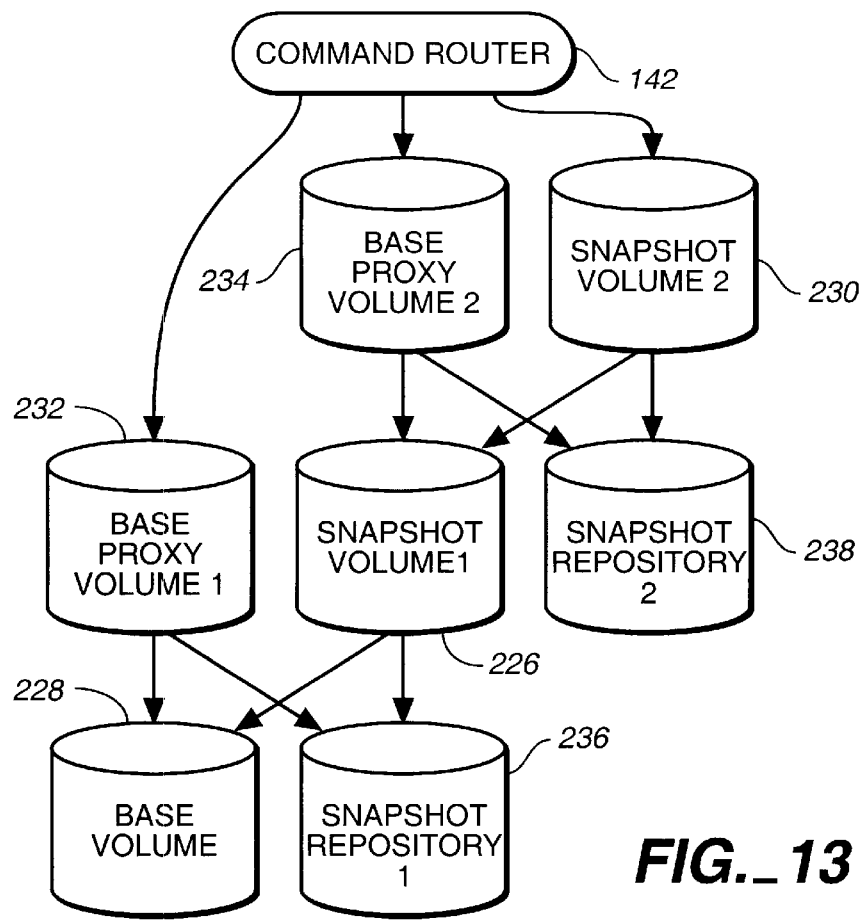
FIG._13
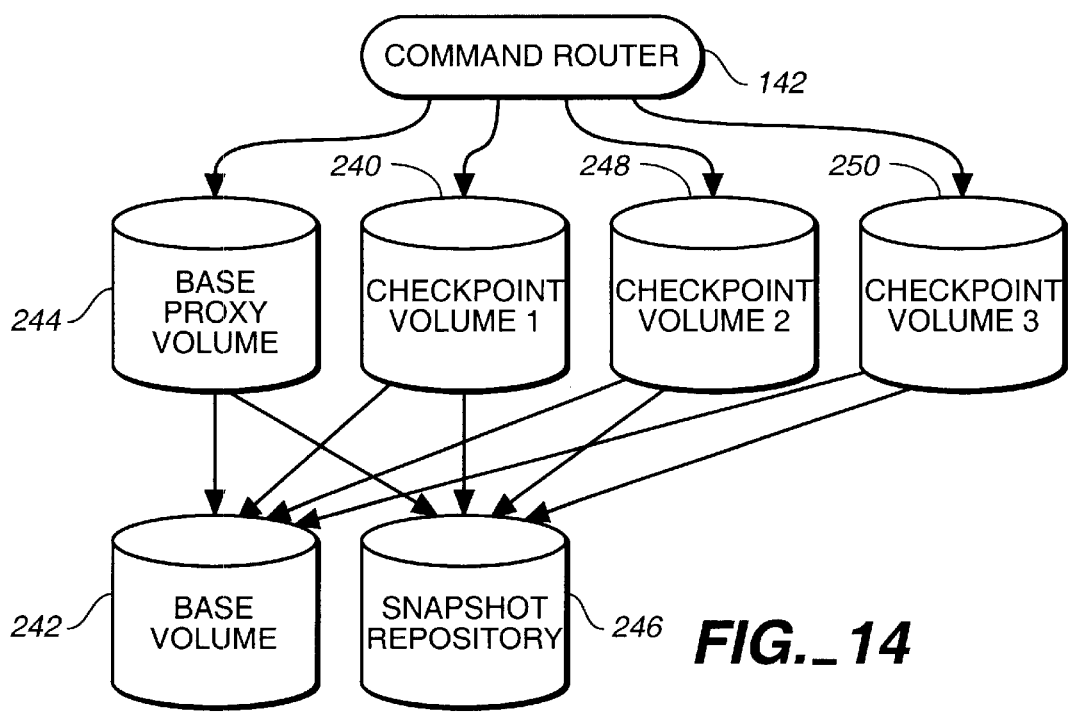
FIG._14

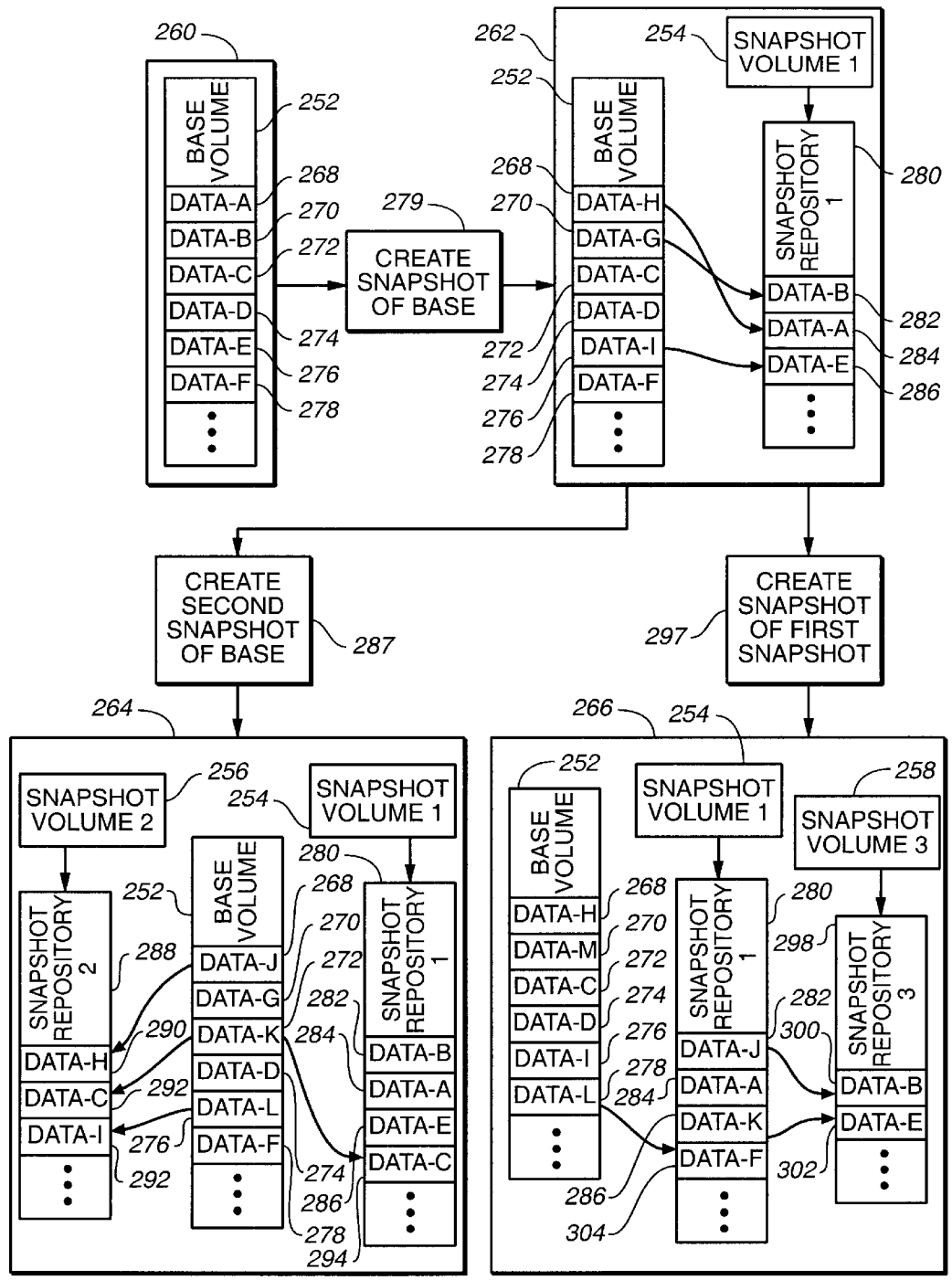
FIG._15

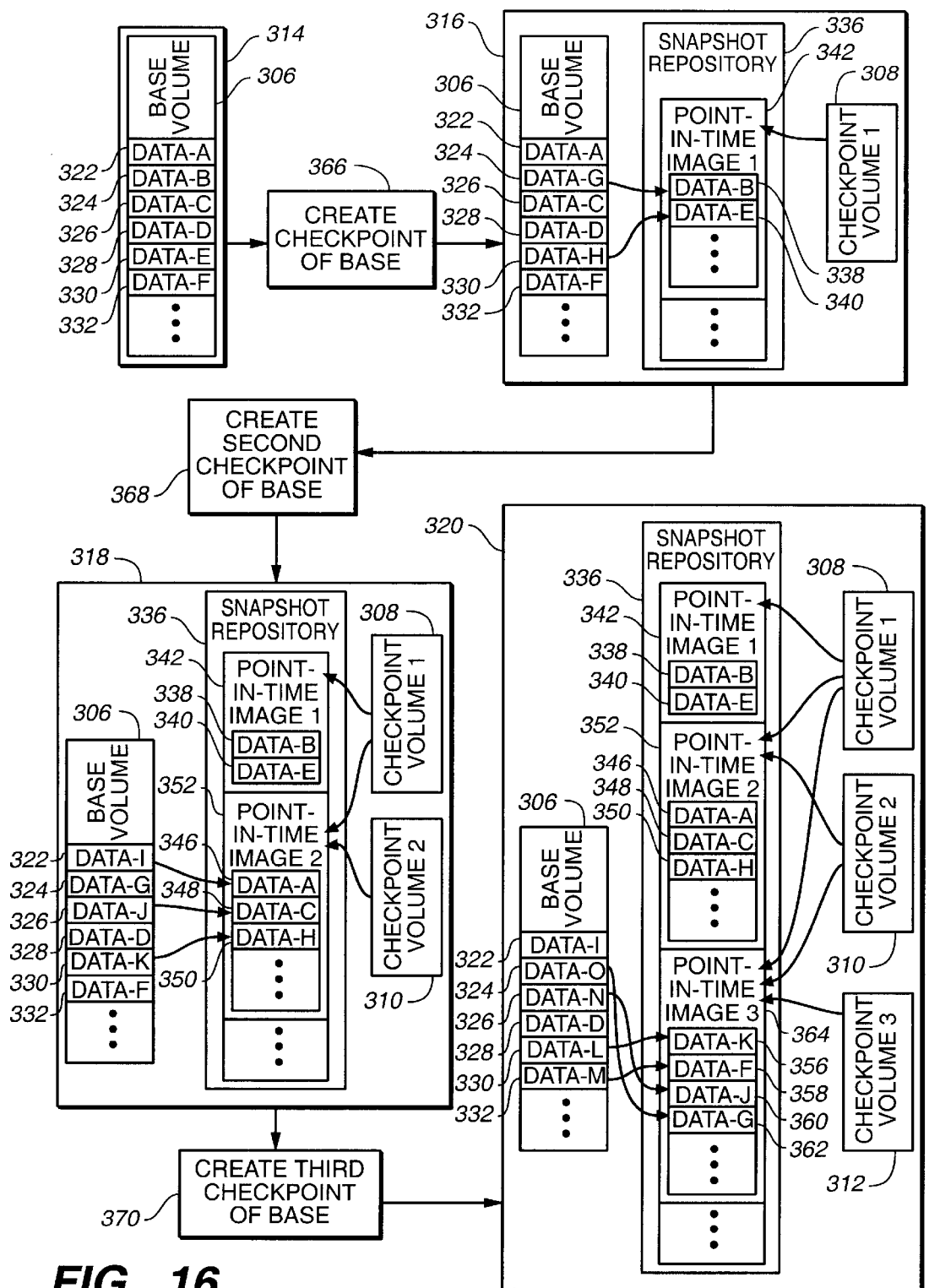
FIG._16

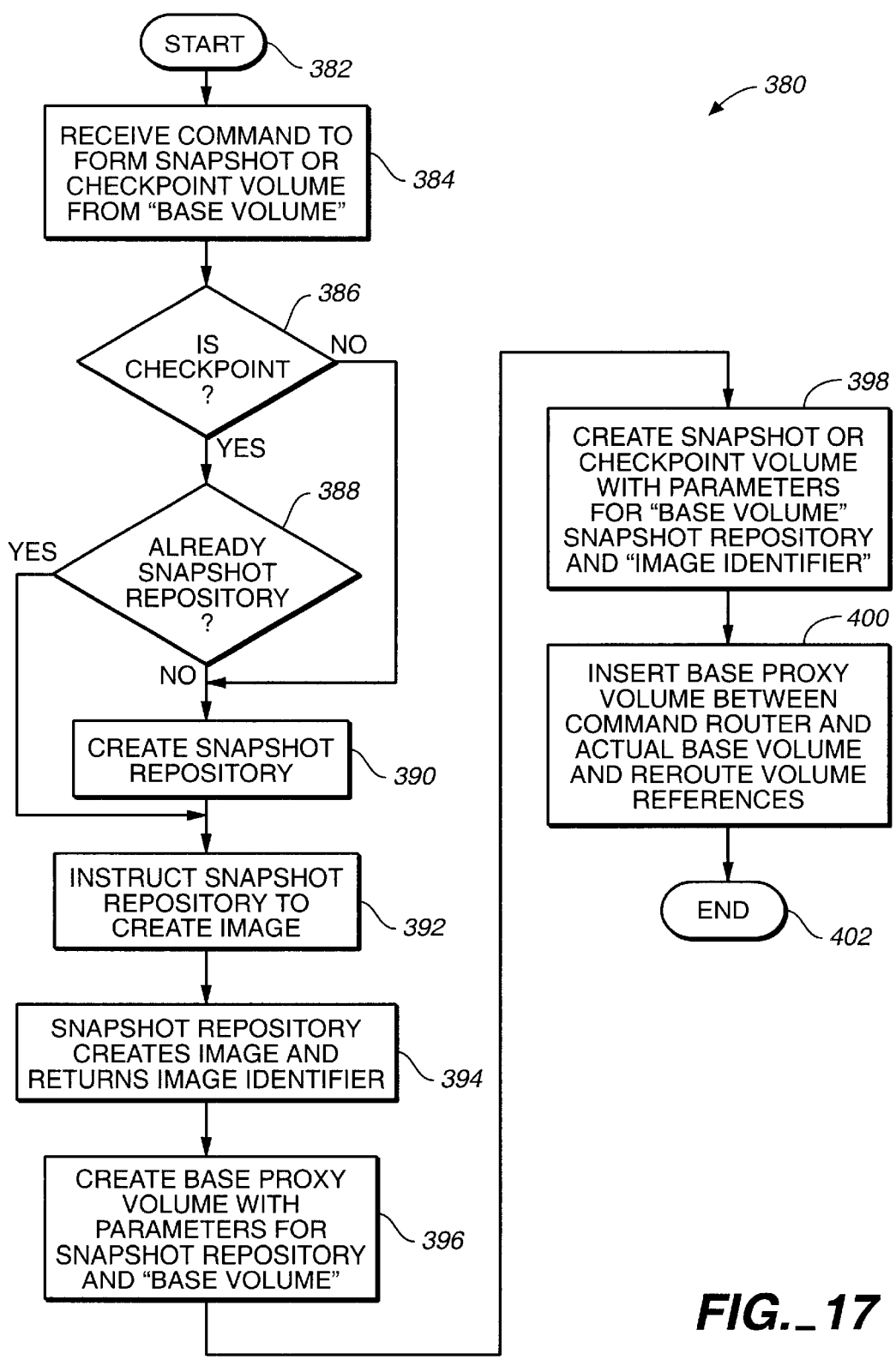
FIG._17

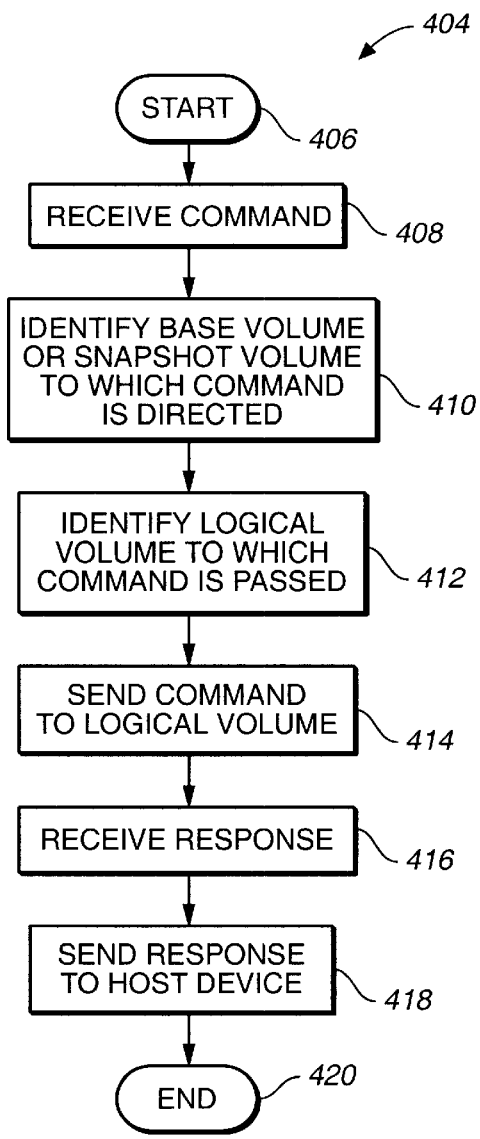
FIG._18
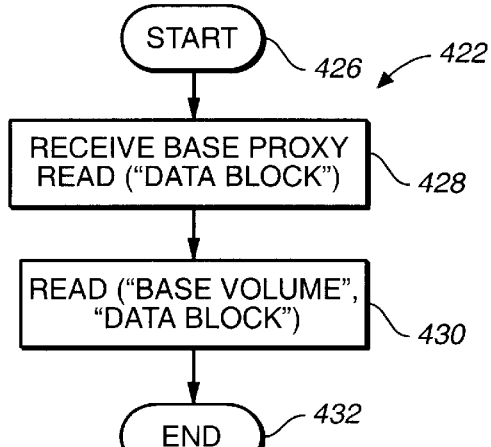
FIG._19

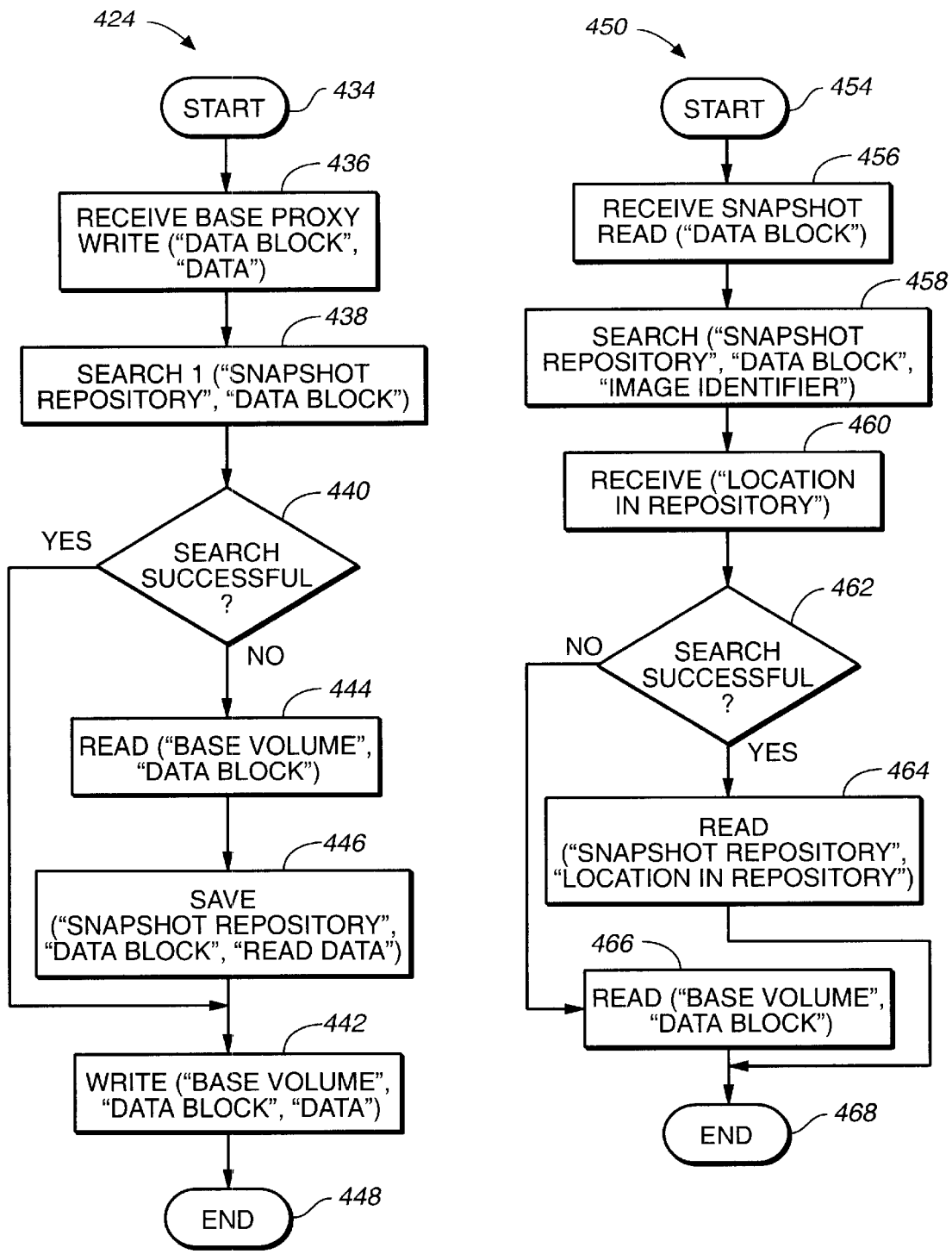

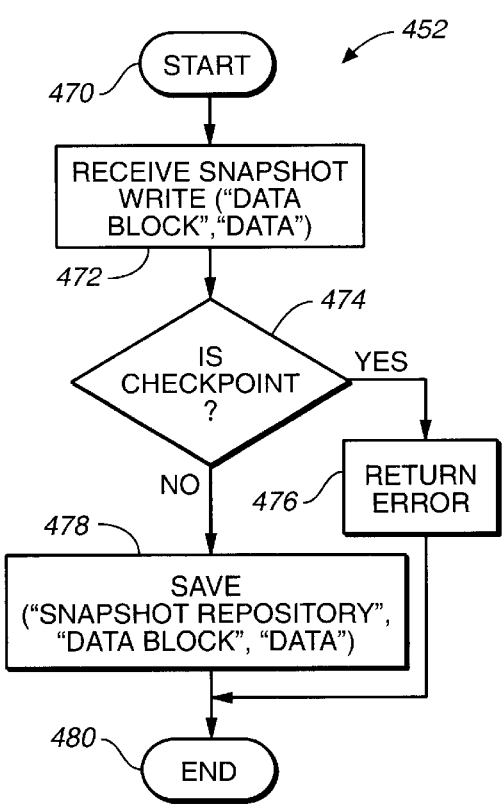
FIG._22
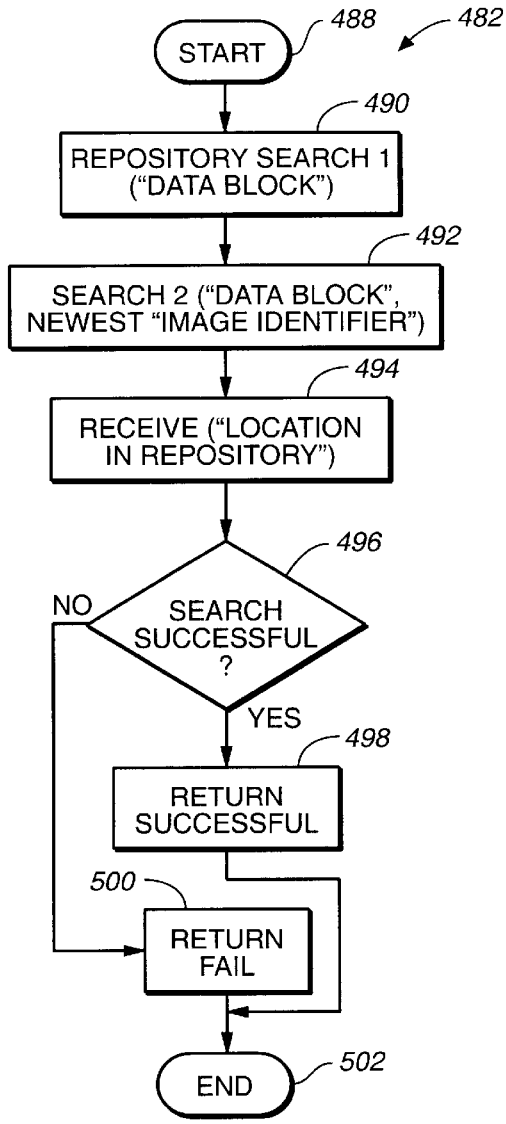
FIG._23

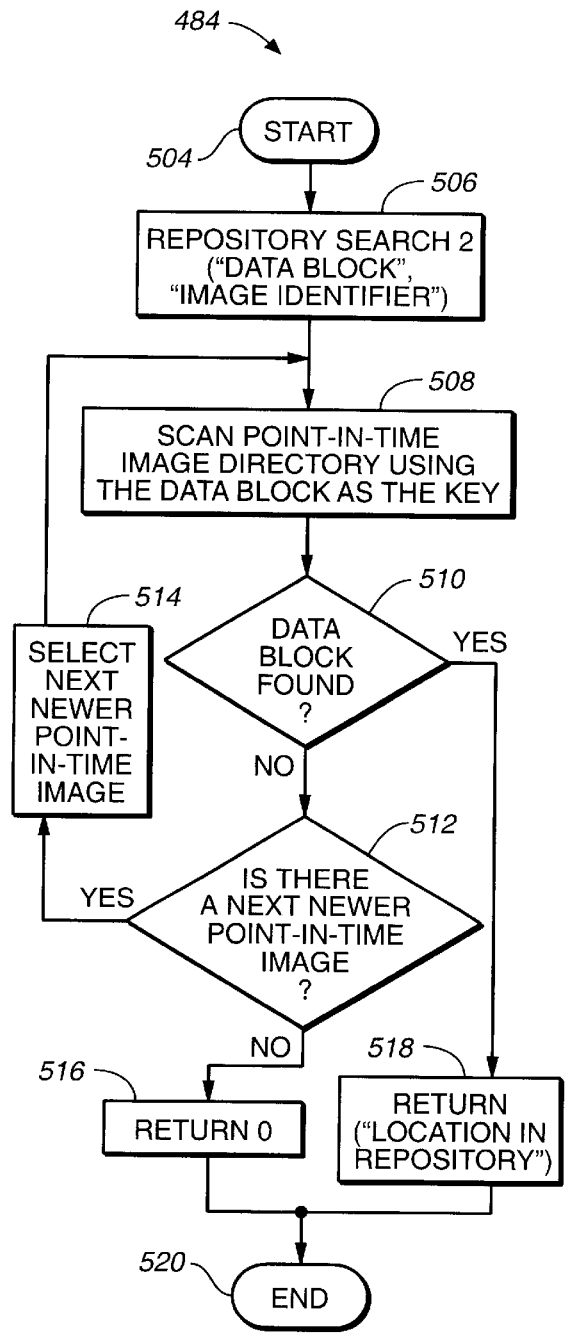
FIG._24
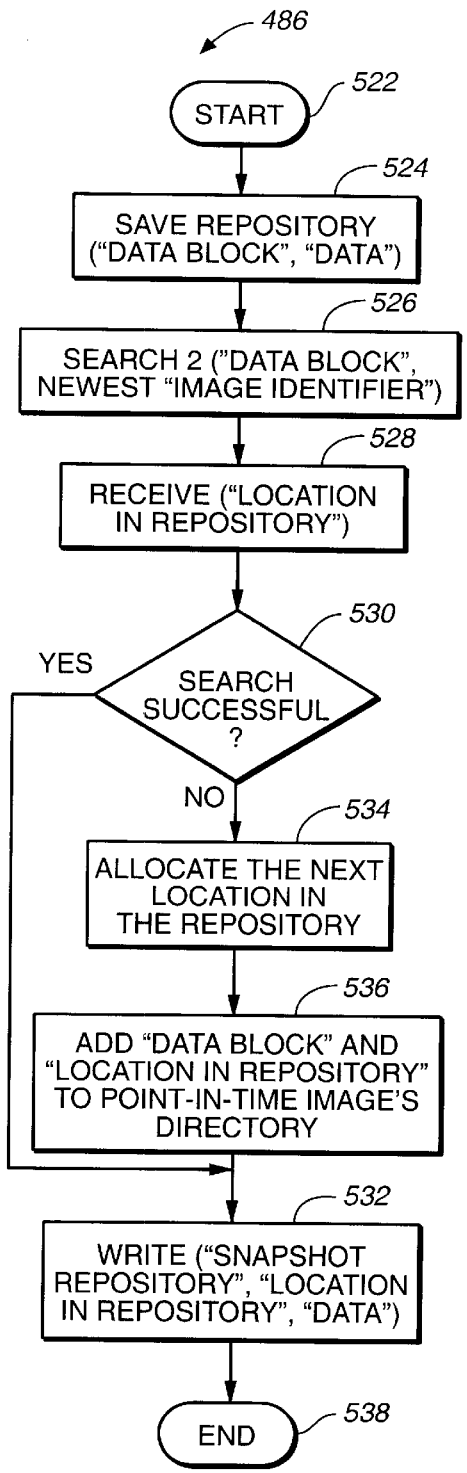
FIG._25

MANAGING A SNAPSHOT VOLUME OR ONE OR MORE CHECKPOINT VOLUMES WITH MULTIPLE POINT-IN-TIME IMAGES IN A SINGLE REPOSITORY

FIELD OF THE INVENTION

This invention relates to data storage in a computerized storage unit, such as a storage array in a storage area network (SAN). More particularly, the present invention relates to management of stored data in the storage unit using "snapshot" or "checkpoint" copies of the data with multiple images of the data contained in a single snapshot repository.

BACKGROUND OF THE INVENTION

Current high-capacity computerized data storage systems typically involve a storage area network (SAN) within which one or more storage arrays store data on behalf of one or more host devices, which in turn typically service data storage requirements of several client devices. Within such a storage system, various techniques are employed to make an image or copy of the data. One such technique involves the making of "snapshot" copies of volumes of data within the storage arrays without taking the original data "offline," or making the data temporarily unavailable. Generally, a snapshot volume represents the state of the original, or base, volume at a particular point in time. Thus, the snapshot volume is said to contain a copy or picture, i.e. "snapshot," of the base volume.

Snapshot volumes are formed to preserve the state of the base volume for various purposes. For example, daily snapshot volumes may be formed in order to show and compare daily changes to the data. Also, a business or enterprise may want to upgrade its software that uses the base volume from an old version of the software to a new version. Before making the upgrade, however, the user, or operator, of the software can form a snapshot volume of the base volume and concurrently run the new untested version of the software on the snapshot volume and the older known stable version of the software on the base volume. The user can then compare the results of both versions, thereby testing the new version for errors and efficiency before actually switching to using the new version of the software with the base volume. Also, the user can make a snapshot volume from the base volume in order to run the data in the snapshot volume through various different scenarios (e.g. financial data manipulated according to various different economic scenarios) without changing or corrupting the original data in the base volume. Additionally, backup volumes (e.g. tape backups) of the base volume can be formed from a snapshot volume of the base volume, so that the base volume does not have to be taken offline, or made unavailable, for an extended period of time to perform the backup, since the formation of the snapshot volume takes considerably less time than does the formation of the backup volume.

Whereas a backup volume of the base volume contains a complete copy of the data in the base volume, the snapshot volume does not actually require a separate complete copy of the data. Instead, the snapshot volume maintains a "repository" (i.e. volume of data storage space in the storage array) that contains only those blocks of the original data that have been changed in the base volume since the point in time at which the snapshot volume was formed. Those data blocks that have not been changed are not copied to the snapshot repository, but remain in the base volume. The snapshot volume, therefore, does not contain any data, but rather relies on the relevant data blocks in the base volume and the snapshot repository to contain the data. Thus, at the moment that the snapshot volume is created, and before any of the data blocks in the base volume have been changed, all of the data for the snapshot volume is in the base volume. On the other hand, after the snapshot volume has been in existence for a while, and if all of the data blocks have been changed in one way or another in the base volume, then all of the data for the snapshot volume is in the snapshot repository. Most likely, however, at any given time after the formation of the snapshot volume, some of the data for the snapshot volume is in the base volume and the remainder of the data is in the snapshot repository.

The first time that data is written to a data block in the base volume after forming a snapshot volume, a copy-on-write procedure is performed to copy the original data block from the base volume to the snapshot repository before writing the new data to the base volume. Afterwards, it is not necessary to copy the data block to the snapshot volume upon subsequent writes to the same data block in the base volume.

Data may also sometimes be written to the repository of the snapshot volume, such as when testing a new version of software or developing scenarios, as described above. Some snapshot volumes, however, are write-protected, so the data in their repositories cannot be changed. Such write-protected snapshot volumes include those used for the limited purpose of serving as a known stable state of the base volume to which the base volume can be restored if the base volume becomes corrupted or invalid. The point at which the known stable state is formed is referred to herein as a "checkpoint," and the known stable state snapshot volume is referred to herein as a "checkpoint volume." By forming multiple checkpoint volumes at periodic intervals, the base volume can be restored, or "rolled back," to one of the known stable states represented by the snapshot or checkpoint volume that is considered to have the best valid data.

When a new snapshot volume (including a new checkpoint volume) is formed, a new repository volume must also be formed. When multiple snapshot volumes have been formed, with every write procedure to a previously unchanged data block of the base volume, a copy-on-write procedure must occur for every affected snapshot volume to copy the prior data from the base volume to each of the repository volumes. Therefore, with several snapshot volumes, the copying process can take up a considerable amount of the storage array's processing time, and the snapshot volumes can take up a considerable amount of the storage array's storage capacity.

It is with respect to these and other background considerations that the present invention has evolved.

SUMMARY OF THE INVENTION

An improvement of the present invention is that a single snapshot repository can contain multiple "point-in-time images" of the data from the base volume from which the snapshot volume or checkpoint volume is formed. Each image, in combination with relevant data blocks in any later-created images, represents the state of the data of the base volume at the point in time at which the image was formed. When a data block in the base volume is changed, the previous data in the data block is copied only to the most recently created image in the repository. Therefore, rather than including duplicate copies of data blocks, each image includes only the data blocks that were copied up until the time at which the next image was created. When performing a data write function to the base volume or the snapshot volume, only the newest image needs to be searched to determine whether the data block is present in the snapshot repository. When performing a data read function on the snapshot volume, the first image is searched and if the data block is not found, then the next-created image is searched, and so on until the last-created image. Additionally, only one copy-on-write procedure is performed to copy a data block for multiple checkpoint volumes that use a single repository. Therefore, the present invention reduces the average amount of processing time required to copy data for a snapshot or checkpoint volume and reduces the amount of storage space needed to form the snapshot repositories.

The present invention also reduces the complexity of managing the data blocks in the repository. The data blocks in one image are written sequentially into contiguous storage space in the repository. The data blocks are also usually used as "read-only" data blocks, particularly for the checkpoint volumes, so the data blocks are rarely changed. Therefore, it is not necessary for storage management software to maintain a detailed accounting of each data block. Instead, the storage management software keeps track of each image, typically a larger amount of storage space than the data blocks requiring less overhead for management, while the individual data blocks are maintained more simply in a sequential manner.

Each snapshot or checkpoint volume corresponds to one or more of the images in the snapshot repository. Since the checkpoint volume is a simplified special case snapshot volume (which cannot be written to and is saved for the sole purpose of maintaining a known stable state to which the base volume can be returned when necessary), more than one checkpoint volume can typically use the same repository and the images therein. However, for the snapshot volumes for which the data can be written or changed, it is preferable to limit the snapshot volumes to one snapshot volume per snapshot repository to avoid complications that may arise when using and changing the data. These snapshot volumes, however, still use more than one image in the snapshot repository.

When a checkpoint volume is formed, a new image is started in the repository. When the next checkpoint volume is formed, another new image is started in the same repository, and the first image is "stopped" or "closed," so no more data can be placed in the first image. The data for the second checkpoint volume, in this situation, is formed only by the data in the second image. The data for the first checkpoint image, however, is formed by the data in both images. Some of the data in the second image, though, may not relate to the first checkpoint volume. For example, when a data block has been copied to the first image, then after the creation of the second image, if the same data block in the base volume is changed again, then the data block is copied to the second image as well. The second time the data block is copied, however, it will have different data that is not relevant to the first checkpoint volume. The first checkpoint volume, thus, relates to the data block in the first image, but not in the second image. When a data block that was not copied to the first image is copied to the second image, however, the data block relates to both checkpoint volumes, since the change to the data block in the base volume, in this case, is the first change to the data block after both checkpoint volumes were created.

A more complete appreciation of the present invention and its scope, and the manner in which it achieves the above noted improvements, can be obtained by reference to the following detailed description of presently preferred embodiments of the invention taken in connection with the accompanying drawings, which are briefly summarized below, and the appended claims.

BRIEF DESCRIPTION OF THE DRAWING

FIG. 1 is a block diagram of a storage area network (SAN) incorporating the present invention.

FIG. 2 is a block diagram of a storage array incorporated in the SAN shown in FIG. 1.

FIGS. 3, 4, 5, 6 and 7 are diagrams of a single snapshot repository illustrating a method of managing multiple point-in-time images for a single snapshot volume in the storage array shown in FIG. 2.

FIGS. 8, 9, 10 and 11 are diagrams of a single snapshot repository illustrating a method of managing multiple point-in-time images for multiple checkpoint volumes in the storage array shown in FIG. 2.

FIG. 12 is a block diagram of a logical relationship between various volumes stored on the storage array shown in FIG. 2, wherein multiple snapshot volumes are formed from one base volume.

FIG. 13 is a block diagram of a logical relationship between various volumes stored on the storage array shown in FIG. 2, wherein a first snapshot volume is formed from a base volume and a second snapshot volume is formed from the first snapshot volume.

FIG. 14 is a block diagram of a logical relationship between various volumes stored on the storage array shown in FIG. 2, wherein multiple checkpoint volumes are formed from one base volume.

FIG. 15 is a chart showing a flow of data between a base volume and multiple snapshot volumes in a procedure to create the snapshot volumes from either the base volume or one of the other snapshot volumes in the storage array shown in FIG. 2.

FIG. 16 is a chart showing a flow of data between the base volume and multiple checkpoint volumes in a procedure to create the checkpoint volumes from the base volume in the storage array shown in FIG. 2.

FIG. 17 is a flowchart for a procedure to create a new snapshot or checkpoint volume in the storage array shown in FIG. 2.

FIG. 18 is a flowchart for a procedure for routing a data access request to a base volume or snapshot volume in the storage array shown in FIG. 2.

FIG. 19 is a flowchart for a procedure for responding to a data read request directed to the base volume in the storage array shown in FIG. 2.

FIG. 20 is a flowchart for a procedure for responding to a data write request directed to the base volume in the storage array shown in FIG. 2.

FIG. 21 is a flowchart for a procedure for responding to a data read request directed to a snapshot or checkpoint volume in the storage array shown in FIG. 2.

FIG. 22 is a flowchart for a procedure for responding to a data write request directed to a snapshot or checkpoint volume in the storage array shown in FIG. 2.

FIGS. 23 and 24 are flowcharts for procedures for searching for a data block in a snapshot repository in the storage array shown in FIG. 2.

FIG. 25 is a flowchart for a procedure to save data to a snapshot repository in the storage array shown in FIG. 2.

DETAILED DESCRIPTION

A storage environment, such as a storage area network (SAN) 100 shown in FIG. 1, generally includes conventional storage banks 102 of several conventional storage devices 103 (e.g. hard drives, tape drives, etc.) that are accessed by one or more conventional host devices 104, 106 and 108 typically on behalf of one or more conventional client devices 110 or applications 112 running on the host devices 104–108. The storage devices 103 in the storage banks 102 are incorporated in conventional high-volume, high-bandwidth storage arrays 114, 116 and 118. Storage space in the storage devices 103 within the storage arrays 114–118 is configured into logical volumes 120 (FIG. 2). The host devices 104–108 utilize the logical volumes 120 to store data for the applications 112 or the client devices 110. The host devices 104–108 issue data access requests, on behalf of the client devices 110 or applications 112, to the storage arrays 114–118 for access to the logical volumes 120.

The storage arrays 114–118 typically have more than one conventional multi-host channel RAID storage controller (a.k.a. array controller) 122 and 124, as shown in storage array 114. The array controllers 122 and 124 work in concert to manage the storage array 114, to create the logical volumes 120 (FIG. 2) and to handle the data access requests to the logical volumes 120 that are received by the storage array 114. The array controllers 122 and 124 connect to the storage devices 103 (e.g. across a conventional shared bus 126) to send and receive data to and from the logical volumes 120. The array controllers 122 and 124 send and receive data, data access requests, message packets and other communication information to and from the host devices 104–108 through conventional interface ports (not shown) connected to conventional switched fabrics 128. The host devices 104–108 send and receive the communication information through conventional host bus adapters (not shown) connected to the switched fabrics 128.

The logical volumes 120 generally include base volumes 130, snapshot volumes 132, base proxy volumes 134 and snapshot repositories 136, as shown in FIG. 2. The base volumes 130 generally contain data accessed by the host devices 104–108 (FIG. 1). The snapshot repositories 136 generally contain point-in-time images (described below) of the data contained in the base volumes 130. The snapshot volumes 132 and base proxy volumes 134 generally enable access to the data in the base volumes 130 and snapshot repositories 136. There may be more than one of each of the types of logical volumes 120 in each storage array 114–118 (FIG. 1).

The logical volumes 120 are shown in the storage controllers 122 and 124, since it is within the storage controllers 122 and 124 that the logical volumes perform their functions and are managed. The storage devices 103 provide the actual storage space for the logical volumes 120.

The primary logical volume 120 for storing data in the storage arrays 114–118 (FIG. 1) is the base volume 130. The base volume 130 typically stores the data that is currently being utilized by the client devices 110 (FIG. 1) or applications 112 (FIG. 1). If no snapshot volume 132 has yet been created for the base volume 130, then the base volume 130 is the only logical volume 120 present. The snapshot volume 132 is created when it is desired to preserve the state of the base volume 130 at a particular point in time. Other snapshot volumes (described below with reference to FIGS. 12–16) may subsequently be created when it is desired to preserve the state of the base volume 130 or of the snapshot volume 132 at another point in time.

The snapshot volumes 132 include checkpoint volumes, which are special-case, or limited-purpose, snapshot volumes to which data typically cannot be written beyond copying the data blocks from the base volume 130. The read-only limitation of checkpoint volumes can generally be circumvented by creating a snapshot volume of the checkpoint volume and writing to the snapshot volume. The checkpoint volumes are usually created at periodic intervals and used as known states of the base volume 130 to which the base volume 130 can be rolled back, or restored, in the event the data in the base volume 130 becomes invalid or corrupted.

The base volumes 130 and the snapshot volumes 132 are addressable, or accessible, by the host devices 104–108 (FIG. 1), since the host devices 104–108 can typically issue read and write access requests to these volumes. The base proxy volumes 134 and snapshot repositories 136, on the other hand, are not addressable by the host devices 104–108. Instead, the base proxy volumes 134 and snapshot repositories 136 are "internal" to the storage controllers 122 and 124, i.e. they perform certain functions transparent to the host devices 104–108 when the host devices 104–108 access the base volumes 130 and snapshot volumes 132.

When the snapshot volume 132 is created, the base proxy volume 134 and the snapshot repository 136 corresponding to the snapshot volume 132 are also created. The snapshot repository 136 contains copies of data blocks (not shown) from the corresponding base volume 130. Each data block is copied to the snapshot repository 136 upon the first time that the data stored within the data block is changed within the base volume 130 after the point in time at which the snapshot volume 132 is created. The snapshot repository 136 also contains software code for performing certain functions, such as searching for data blocks within the snapshot repository 136 and saving data blocks to the snapshot repository 136 (functions described below). Since the snapshot repository 136 is "internal" to the storage controllers 122 and 124, it only responds to commands from the corresponding base proxy volume 134 and snapshot volume 132, transparent to the host devices 104–108 (FIG. 1).

The snapshot volume 132 represents the state of the data in the corresponding base volume 130 at the point in time when the snapshot volume 132 was created. A data access request that is directed to the snapshot volume 132 will be satisfied by data either in the snapshot repository 136 or in the base volume 130. Thus, the snapshot volume 132 does not contain any of the data. Rather, the snapshot volume 132 includes identifiers for the corresponding base volume 130, snapshot repository 136 and the point-in-time images (described below) within the snapshot repository 136. The snapshot volume 132 also includes software code for performing certain functions, such as data read and write functions (described below), on the corresponding base volume 130 and snapshot repository 136. In other words, the snapshot volume 132 issues commands to "call" the corresponding base volume 130 and snapshot repository 136 to perform these functions. Additionally, it is possible to reconstruct, or rollback, the corresponding base volume 130 to the state at the point in time when the snapshot volume 132 was created by copying the data blocks in the corresponding snapshot repository 136 back to the base volume 130 by issuing a data read request to the snapshot volume 132.

The base proxy volume 134 intercepts the data access requests directed to the base volume 130 transparent to the host devices 104–108 (FIG. 1). The base proxy volume 134 includes software code for performing certain functions, such as data read and write functions and copy-on-write functions (functions described below), on the corresponding base volume 130 and snapshot repository 136. In other words, the snapshot volume 132 issues commands to "call" the corresponding base volume 130 and snapshot repository 136 to perform these functions. Thus, the base proxy volume 134 does not contain any of the data, but includes identifiers for the corresponding base volume 130 and snapshot repository 136.

Typically, there is one base proxy volume 134 for one snapshot repository 136. Additionally, there is usually one snapshot volume 132 for one snapshot repository 136, but for the special-case snapshot volumes of checkpoint volumes, there may be more than one checkpoint volume for one snapshot repository 136.

A command router 142 (a software program) executes on each of the storage controllers 122 and 124 to receive and process data access commands directed to the base volume 130 and the snapshot volume 132. Thus, the command router 142 "calls," or issues commands to, the base proxy volume 134 (or the base volume 130 if there is no base proxy volume 134) and the snapshot volume 132 to perform the data read and write functions and other functions. Thus, the command router 142 includes identifiers for the base proxy volume 134 (or the base volume 130 if there are no base proxy volumes 134 or the topmost base proxy volume 134 if there are multiple base proxy volumes 134 in a hierarchy of base proxy volumes 134) and the snapshot volumes 132.

Additionally, a volume manager 144 (a software program) executes on each of the storage controllers 122 and 124 to manage the creation and deletion of the snapshot volumes 132, the base proxy volumes 134, the snapshot repositories 136 and point-in-time images (described below) within the snapshot repositories 136. Thus, the volume manager 144 creates all of the desired snapshot volumes 132 from the base volume 130 or any previously created snapshot volume 132, typically in response to commands from the host devices 104–108 (FIG. 1) or one of the client devices (FIG. 1) under control of a system administrator. The volume manager 144 also configures the command router 142 with the identifiers for the topmost base proxy volume 134 and the snapshot volumes 132 and configures the base proxy volumes 134 and the snapshot volumes 132 with the identifiers for the corresponding base volumes 130, snapshot repositories 136 and point-in-time images (described below) within the snapshot repositories 136.

The technique for storing the data for the snapshot volume 132 in the snapshot repository 136 using multiple point-in-time images is illustrated in FIGS. 3–7. The snapshot repository 136 includes a header section 148 and a data section 150 as shown in FIGS. 3–7. The data section 150 includes one or more point-in-time images 152 (FIGS. 3 and 4), 154 (FIGS. 4–6), 156 (FIGS. 5 and 6), 158 (FIG. 6) and 160 (FIG. 7). The point-in-time images 152–160 include data and a directory.

The volume manager 144 (FIG. 2) creates the snapshot volume 132 and the snapshot repository 136 in storage spaces within the storage devices 103 (FIGS. 1 and 2) and creates the initial point-in-time image 152 within the data section 150 as shown in FIG. 3. The volume manager 144 configures the snapshot volume 132 with the identifier for the snapshot repository 136 and the point-in-time image 152, thereby linking the snapshot volume 132 with the snapshot repository 136 and the point-in-time image 152. Information in the header section 148 points to the start of the point-in-time image 152. As data is written to the snapshot repository 136, the point-in-time image 152 grows into the unused portion 162 of the data section 150.

At some point the volume manager 144 (FIG. 2) may have to stop adding data to the point-in-time image 152 while still adding data to the snapshot repository 136 for the snapshot volume 132 as shown in FIG. 4. For example, the host device 104,106 or 108 (FIG. 1) may determine that it is necessary to return the base volume 130 (FIG. 2) to the state at the time at which the snapshot volume 132 was formed. The procedure to return the base volume 130 to a previous state is called a "rollback" procedure. In this case, the volume manager 144 must stop adding data to the point-in-time image 152, so the point-in-time image 152 can be used to return the affected data blocks (not shown) to the base volume 130. Additionally, unless the volume manager 144 is also instructed to stop adding data to the snapshot volume 132, a second point-in-time image 154 is created at the time the rollback procedure begins, preferably starting immediately after the stop point for the first point-in-time image 152. The information in the header section 148, thus, points to the start of the first point-in-time image 152 as the start of the data used for the rollback procedure and points to the start of the second point-in-time image 154 as the start of the data for the snapshot volume 132.

The data in the first point-in-time image 152 is still related to the snapshot volume 132. Since the data in the first point-in-time image 152 is being returned to the base volume 130, however, it is not necessary to keep the data in the snapshot repository 136. Therefore, the first point-in-time image 152 will be deleted from the snapshot repository 136 after the rollback procedure has completed. The information in the snapshot volume 132, therefore, is updated with an identifier for the second point-in-time image 154, thereby linking the snapshot volume 132 with the second point-in-time image 154. The rollback procedure can be performed concurrently with continuing normal data access requests to the base volume 130 and the snapshot volume 132, so the second point-in-time image 154 grows into the remaining unused portion 162 of the snapshot repository 136.

After the rollback procedure has completed and the first point-in-time image 152 has been deleted, as shown in FIG. 5, the data access requests to the base volume 130 (FIG. 2) and the snapshot volume 132 continue, so the second point-in-time image 154 eventually grows to the end of the extent of the snapshot repository 136. Since the portion of the snapshot repository previously occupied by the first point-in-time image 152 is now the unused portion 164, additional data may now be written starting at the beginning of the data section 150. The second point-in-time image 154, thus, stops at the end of the extent of the snapshot repository 136, and a third point-in-time image 156 starts at the beginning of the data section 150. The information in the header section 148, thus, point to the start of the second point-in-time image 154 as the start of the data for the snapshot volume 132, and information in the second point-in-time image 154 points to the start of the third point-in-time image 156 as the continuation of the data for the snapshot volume 132. The snapshot volume 132 is still linked to the second point-in-time image 154, and is now indirectly linked to the third point-in-time image 156.

When the third point-in-time image 156 grows to completely fill the unused portion 164 (FIG. 5) of the snapshot repository 136, as shown in FIG. 6, the snapshot repository 136 will be completely filled and the snapshot volume 132 will have to be stopped, unless the volume manager 144 (FIG. 2) expands the extent of the snapshot repository 136 with additional space 166 at the end of the previous extent of the snapshot repository 136. With the additional space 166, the snapshot volume 132 can be continued, so the third point-in-time image 156 is stopped at the end of the unused portion 164 (FIG. 4), and a fourth point-in-time image 158 is started in the additional space 166 to grow into the unused portion 168. Thus, the information in the header section 148 still points to the start of the second point-in-time image 154 as the start of the snapshot volume 132, the information in the second point-in-time image 154 still points to the start of the third point-in-time image 156, and information in the third point-in-time image 156 points to the start of the fourth point-in-time image 158 as the continuation of the data for the snapshot volume 132.

At some point, the host device 104,106 or 108 (FIG. 1) may instruct the volume manager 144 (FIG. 2) to stop and restart the snapshot volume 132, as shown in FIG. 7. In this case, all of the existing point-in-time images 154, 156 and 158 are deleted and a fifth point-in-time image 160 is begun at the start of the data section 150 of the snapshot repository 136. Thus, the information in the header section 148 points to the start of the fifth point-in-time image 168, which grows into the unused portion 170 of the data section 150. Also, the snapshot volume 132 is updated with an identifier for the fifth point-in-time image 168.

As can be seen in the examples shown in FIGS. 3–7, multiple point-in-time images 152, 154, 156, 158 and 160 are used to store the data for the snapshot volume 132 in a single snapshot repository 136. In this manner, the complicated data management record-keeping required in the prior art for keeping track of all of the individual blocks of data within the snapshot repository 136 is not required. Instead, since the images 152, 154, 156, 158 and 160 typically contain much more than a single data block, data management record-keeping has to keep track of far fewer divisions of the snapshot repository 136. Additionally, since each image is restricted to growing only sequentially, minimal data management record-keeping, which only has to link each sequential data block within the image, is required to keep track of the individual data blocks.

A technique for maintaining the data for multiple special-case checkpoint volumes (described above) 172, 174, 176 and 178 created from the same base volume 130 (FIG. 2) in a single snapshot repository 180 is illustrated in FIGS. 8, 9, 10 and 11. For each of the checkpoint volumes 172, 174, 176 and 178, the volume manager 144 (FIG. 2) has created, or allocated storage space for, one point-in-time image 182, 184, 186 and 188, respectively, as shown in FIG. 8. Each point-in-time image 182, 184 and 186, before the creation of the subsequent point-in-time images 184, 186 and 188, respectively, was allowed to grow into the unused portion 190 of the data section 192 of the snapshot repository 180. When the subsequent point-in-time images 184, 186 and 188 were created, the previous point-in-time images 182, 184 and 186, respectively, were effectively stopped. For example, when the first checkpoint volume 172 was created, the first point-in-time image 182 was the only image in the data section 192. When the second checkpoint volume 174 was created, however, no additional storage space could be allocated for the first point-in-time image 182, so the first point-in-time image 182 was effectively stopped, and the second point-in-time image 184 was allocated, or started. The first point-in-time image 182 is linked to the second point-in-time image 184. Thus, the second checkpoint volume 174 included an identifier for and depended on only the second point-in-time image 184, and the first checkpoint volume 172 included an identifier for the first point-in-time image, but depended on both the first and second point-in-time images 182 and 184. In other words, the second checkpoint volume 174 is linked to the second point-in-time image 184, and the first checkpoint volume 172 is linked to the first point-in-time image 182 and indirectly to the second point-in-time image 184.

When the third checkpoint volume 176 was created, the second point-in-time image 184 was effectively stopped, and the third point-in-time image 186 was created. Thus, the third checkpoint volume 176 depended on only the third point-in-time image 186, but the second checkpoint volume 174 depended on the second and third point-in-time images 184 and 186, and the first checkpoint volume 172 depended on all three point-in-time images 182,184 and 186. Likewise, after the creation of the fourth checkpoint volume 178, the fourth checkpoint volume 178 depended on only the fourth point-in-time image 188, the third checkpoint volume 176 depended on the third and fourth point-in-time images 186 and 188, the second check point volume 174 depended on the second, third and fourth point-in-time images 184,186 and 188, and the first checkpoint volume 172 depended on all four of the point-in-time images 182,184, 186 and 188. Therefore, the information in the header section 194 of the snapshot repository 180 points to the start of the first point-in-time image 182, the information in the first point-in-time image 182 points to the start of the second point-in-time image 184, the information in the second point-in-time image 184 points to the start of the third point-in-time image 186, and the information in the third point-in-time image 186 points to the start of the fourth point-in-time image 188.

It is preferable to maintain only a certain number of the most recent checkpoint volumes, so at some point the volume manager 144 (FIG. 2) will be instructed to delete one or more of the checkpoint volumes, as shown in FIG. 9. In this case, the first and second check point volumes 172 and 174 (FIG. 8) have been deleted. Additionally, since the first and second point-in-time images 182 and 184 (FIG. 8) are not needed for the remaining checkpoint volumes 176 and 178, the point-in-time images 182 and 184 are deleted. Thus, the information in the header section 194 points to the start of the third point-in-time image 186 as the start of the initial image in the snapshot repository 180, and the information in the third point-in-time image 186 still points to the start of the fourth point-in-time image 188. The portion of the data section 192 that was occupied by the first and second point-in-time images 182 and 184 becomes an additional unused portion 196 of the data section 192.

The volume manager 144 (FIG. 2) may create a fifth checkpoint volume 198 from the base volume 130 (FIG. 2), as shown in FIG. 10. Along with the fifth checkpoint volume 198, the volume manager 144 also creates a fifth point-in-time image 200 preferably following the fourth point-in-time image 188. Once the fifth point-in-time image 200 fills the unused portion 190 (FIG. 9) of the data section 192, the fifth point-in-time image 200 is stopped and a sixth point-in-time image 202 is started in the unused portion 196 at the beginning of the data section 192. The fifth checkpoint volume 198 includes an identifier for the fifth point-in-time image 200, but depends on both the fifth and sixth point-in-time images 200 and 202. Additionally, the fourth checkpoint volume 178 depends on the fourth, fifth and sixth point-in-time images 188, 200 and 202, and the third checkpoint volume 176 depends on all four of the point-in-time images 186, 188, 200 and 202. Thus, three checkpoint volumes 176, 178 and 198 are formed with four point-in-time images 186, 188, 200 and 202.

At some point the volume manager 144 (FIG. 2) may be instructed to perform a rollback procedure to return the base volume 130 (FIG. 2) to the state at the creation of one of the checkpoint volumes, as shown in FIG. 11. In this case, the fourth checkpoint volume 178 is used in the rollback procedure. Thus, the sixth point-in-time image 202 is stopped, so that the data in the fourth, fifth and sixth point-in-time images 188, 200 and 202 can be used for the rollback procedure. Additionally, unless the volume manager 144 has been instructed to stop or delete the fourth checkpoint volume 178, a seventh point-in-time image 204 is started. The fourth checkpoint volume 178 now depends on only the seventh point-in-time image 204. Since the data in the fourth, fifth and sixth point-in-time images 188, 200 and 202 is being restored to the base volume 130, it is not necessary to also keep this data in the snapshot repository 180, so the fourth, fifth and sixth point in time images 188, 200 and 202 will be deleted after the rollback procedure completes. The third checkpoint volume 176, thus, now depends on the third point-in-time image 186 and the seventh point-in-time image 204. The fifth checkpoint volume 198 (FIG. 9) is preferably deleted, since it would be a redundant copy of the fourth checkpoint volume 178. The information in the header section 194 now points to the start of the fourth point-in-time image 188 as the start of the data for the rollback procedure and points to the start of the third point-in-time image 186 as the start of the initial point-in-time image in the snapshot repository 180. Additionally, the information in the third point-in-time image 186 now points to the start of the seventh point-in-time image 204.

As can be seen in the examples shown in FIGS. 8, 9, 10 and 11, multiple checkpoint volumes 172, 174, 176, 178 and 198 formed from the same base volume 130 (FIG. 2) can be maintained in a single snapshot repository 180 using multiple point-in-time images 182, 184, 186, 188, 200, 202 and 204. In this manner, it is not necessary to form a new snapshot repository for each checkpoint volume and to duplicate copied data blocks from the base volume 130 in all of the snapshot repositories. Therefore, time is saved in performing the copy-on-write procedures when data is written to the base volume 130, and a minimal amount of the storage space in the bank of storage devices 102 (FIGS. 1 and 2) is utilized for the checkpoint volumes.

When more than one snapshot volume (e.g. three snapshot volumes 206, 208 and 210) are created for the same base volume 212, corresponding base proxy volumes 214, 216 and 218 and snapshot repositories 220, 222 and 224 are also created, as shown in an exemplary logical hierarchical relationship shown in FIG. 12. The base proxy volumes 214–218 are linked to each other and to the base volume 212 and the command router 142, so the command router 142 can call the topmost base proxy volume 214, the base proxy volumes 214 and 216 can call the subsequent base proxy volumes 216 and 218, respectively, and the lowest base proxy volume 218 can call the base volume 212 to respond to the data access requests directed to the base volume 212. Thus, the base proxy volumes 214 and 216 are logically linked to the next base proxy volumes 216 and 218, respectively, and the lowest base proxy volume 218 is linked to the base volume 212. The base proxy volumes 214–216 are also linked to the corresponding snapshot repositories 220–224, so the base proxy volumes 214–216 can perform the copy-on-write procedures to the correct snapshot repository 220–224 when required.

The snapshot volumes 206–210 are linked to the corresponding snapshot repositories 220–224 and the command router 142. Thus, the command router 142 can call the snapshot volumes 206–210 when a data access request is directed thereto and the snapshot volumes 206–210 can call the corresponding snapshot repositories 220–224 to access the desired data block in the snapshot repositories 220–224. The snapshot volumes 206 and 208 are also linked to the base proxy volumes 216 and 218, respectively, and the lowest snapshot volume 210 is linked to the base volume 212. Thus, the base proxy volumes 216 and 218 serve as the "base volumes" for the snapshot volumes 206 and 208, respectively, and the base volume 212 is the base volume for the snapshot volume 210. In this manner, the snapshot volumes 206–210 can call their "base volumes" when necessary to respond to the data access requests.

The order of the base proxy volumes 214–218 and the snapshot volumes 206–210 does not depend on the order of their creation. For example, if the volume manager 144 (FIG. 2) created the snapshot volume 210 first, then the volume manager 144 also originally created both the base proxy volume 218 and the snapshot volume 210 with links to the base volume 212 and the snapshot repository 224. If the volume manager 144 created the snapshot volume 206 second, then both the base proxy volume 214 and the snapshot volume 206 were originally created with links to the base proxy volume 218 and the snapshot repository 220. If the volume manager 144 created the snapshot volume 208 third, but for some reason was instructed to insert it between the first two snapshot volumes 206 and 210, then both the base proxy volume 216 and the snapshot volume 208 were originally created with links to the base proxy volume 218 and the snapshot repository 222, but the links for both the base proxy volume 214 and the snapshot volume 206 to the base proxy volume 218 were changed to the base proxy volume 216. The links for the base proxy volume 214 and the snapshot volume 206 to the snapshot repository 220, however, remained unchanged. Any number of other snapshot volumes may be created by the volume manager 144 and inserted at any point in the hierarchy shown in FIG. 12.

A data access request from one of the host devices 104, 106 or 108 (FIG. 1) may be directed to the base volume 212 or any of the snapshot volumes 206, 208 or 210. When a data access request is received at the storage controller 122 or 124 (FIG. 2), if the data access request is directed to the base volume 212, the command router 142 calls the base proxy volume 214 to handle the data access request. If the data access request is a "read" request, then since the base proxy volume 214 links to the base proxy volume 216, the base proxy volume 214 calls the next base proxy volume 216. Likewise, the base proxy volume 216 calls the base proxy volume 218, which in turn calls the base volume 212. In this manner, the read request essentially "passes through" the base proxy volumes 214, 216 and 218 to the base volume 212. To return the requested data, the response from the base volume 212 "passes through" the base proxy volumes 214, 216 and 218 to the command router 142, which sends the requested data to the host device 104, 106 or 108.

If the data access request is a "write" request directed to the base volume 212, then similar to the read request situation described above, the write request passes through the command router 142 and the base proxy volumes 214, 216 and 218 down to the base volume 212, which writes the data to the target data block (not shown) in the base volume 212. In addition, however, the base proxy volumes 214, 216 and 218 also perform a search for the target data block in the corresponding snapshot repository 220, 222 and 224 and a copy-on-write procedure if necessary before passing the write request to the next volume. For example, if the search by the base proxy volume 214 indicates that the write request is directed to a target data block (not shown) in the base volume 212 that has already been copied to the snapshot repository 220, then a copy-on-write procedure is not necessary, so the base proxy volume 214 immediately passes the write request to the next base proxy volume 216. On the other hand, if the search by the base proxy volume 214 indicates that the target data block in the base volume 212 has not been copied to the snapshot repository 220, then the base proxy volume 214 performs a copy-on-write procedure to copy the target data block from the base volume 212 to the snapshot repository 220. Thus, the base proxy volume 214 issues a read request to the next base proxy volume 216, but directed to the base volume 212. The read request is passed down through the base proxy volumes 216 and 218 to the base volume 212, which sends the target data block back to the base proxy volume 214 through the base proxy volumes 218 and 216. The information in the base proxy volume 214 then writes the data from the target data block to a data block (not shown) in the snapshot repository 220. The base proxy volume 214 then passes the original write request to the base proxy volume 216. As described above with respect to the base proxy volume 214, the base proxy volume 216 performs a copy-on-write procedure to copy the target data block to the snapshot repository 222 if necessary and then passes the write request to the base proxy volume 218. Again, the base proxy volume 218 performs a copy-on-write procedure to copy the target data block to the snapshot repository 224 if necessary and then passes the write request to the base volume 212. With the original write request, the base volume 212 writes the data to the target data block in the base volume 212.

If the data access request is directed to a target data block (not shown) in one of the snapshot volumes 206, 208 or 210, then the command router 142 calls the desired snapshot volume 206, 208 or 210. If the data access request is a read request, then the desired snapshot volume 206, 208 or 210 searches for the target data block in the corresponding snapshot repository 220, 222 or 224. If found in the corresponding snapshot repository 220, 222 or 224, the desired snapshot volume 206, 208 or 210 reads the target data block from the corresponding snapshot repository 220, 222 or 224. If the target data block was not found in the corresponding snapshot repository 220, 222 or 224, then the desired snapshot volume 206, 208 or 210 reads the target data block from the base volume 212. If the data access request is a write request, then the desired snapshot volume 206, 208 or 210 allocates space for the target data block in the corresponding snapshot repository 220, 222 or 224 (if not already present in the newest point-in-time image) and writes the new data to the corresponding snapshot repository 220, 222 or 224.

When one snapshot volume 226 is created from a base volume 228, and another snapshot volume 230 is created from the first snapshot volume 226, then base proxy volumes 232 and 234 and snapshot repositories 236 and 238, corresponding to the snapshot volumes 226 and 230, respectively, are also created, as shown in an exemplary logical hierarchical relationship shown in FIG. 13. In this hierarchy, the snapshot volume 226 and the base proxy volume 232 are both linked to the base volume 228 and the snapshot repository 236. The snapshot volume 230 and the base proxy volume 234, however, are both linked to the snapshot volume 226 and the snapshot repository 238. In this case, therefore, the snapshot volume 226 is treated as the "base volume" for the snapshot volume 230 and the base proxy volume 234.

In this situation, the order of the snapshot volumes 226 and 230 depends on the order of the creation of the snapshot volumes 226 and 230, since the snapshot volume 226 must have already been created in order for the snapshot volume 230 to be created therefrom. For example, the volume manager 144 (FIG. 2) created the snapshot volume 226 first, along with the base proxy volume 232 and the snapshot repository 236. Then the volume manager 144 created the snapshot volume 230, along with the base proxy volume 234 and the snapshot repository 238. Other snapshot volumes (not shown) can be created from the base volume 228 and the snapshot volumes 226 and 230 and inserted in any order above or below the proper base proxy volume 232 or 234. Therefore, any combination of hierarchies as shown in FIGS. 12 and 13 may be created by the volume manager 144.

A data access request from one of the host devices 104, 106 or 108 (FIG. 1) may be directed to the base volume 228 or either of the snapshot volumes 226 or 230. When a data access request is received at the storage controller 122 or 124 (FIGS. 1 and 2), if the data access request is directed to the base volume 228, the command router 142 calls the base proxy volume 232 to handle the data access request, and the base proxy volume 232 proceeds similarly as described above with reference to data access requests directed to the base volume 212 (FIG. 12).

If the data access request is directed to the snapshot volume 226, however, the command router 142 calls the base proxy volume 234 as if the command router 142 were attempting to access a base volume. If the data access request is a read request or a write request for which a copy-on-write procedure is not required, then the base proxy volume 234 calls the snapshot volume 226. The snapshot volume 226 proceeds as described above with reference to accessing the snapshot volume 210 (FIG. 12).

If the data access request is a write request to the snapshot volume 226, the base proxy volume 234 performs a copy-on-write procedure if required. To perform the copy-on-write procedure, the base proxy volume 234 issues a read request for the target data block (not shown) to the snapshot volume 226. The snapshot volume 226 issues a search command for the target data block in the snapshot repository 236. If the target data block is found by the snapshot repository 236, then the snapshot volume 226 reads the target data block from the snapshot repository 236 and passes the response to the base proxy volume 234, which writes the target data block to the snapshot repository 238. On the other hand, if the target data block is not found by the snapshot repository 236, then the snapshot volume 226 reads the target data block from the base volume 228 and passes the response to the base proxy volume 234. After the target data block has been copied to the snapshot repository 238, the base proxy volume 234 passes the original write request to the snapshot volume 226 to satisfy the write request as described above with reference to the write request to the snapshot volume 210 (FIG. 12).

If the data access request is directed to the snapshot volume 230, then the command router 142 proceeds, similarly as described above with reference to the data access request to the snapshot volume 210 (FIG. 12), to call the snapshot volume 230. The snapshot volume 230 calls the "base volume" of the snapshot volume 230 (i.e. snapshot volume 226) or the snapshot repository 238 to satisfy the data access request. However, when the snapshot volume 230 calls the a "base volume" thereof (snapshot volume 226), the snapshot volume 226 responds similarly as described above with reference to the data access request to the snapshot volume 210. In other words, the snapshot volume 226 calls the base volume 228 or the snapshot repository 236, but returns the response to snapshot volume 230.

When a checkpoint volume 240 is created from a base volume 242, then a base proxy volume 244 and a snapshot repository 246 are also created, as shown in an exemplary logical hierarchical relationship shown in FIG. 14. The checkpoint volume 240 and the base proxy volume 244 are both linked to the base volume 242 and the snapshot repository 246. The subsequent creation of other checkpoint volumes 248 and 250 from the base volume 242, however, does not result in the creation of other base proxy volumes or snapshot repositories. Instead, in this hierarchy, the subsequent checkpoint volumes 248 and 250 are also linked to the base volume 242 and the snapshot repository 246, since, as described above, the special-case checkpoint volumes created from the same base volume can use the same snapshot repository.

In this situation, the volume manager 144 (FIG. 2) created the checkpoint volume 240 first, along with the base proxy volume 244 and the snapshot repository 246. Later, the volume manager 144 created the checkpoint volumes 248 and 250. Any number of checkpoint volumes may be created by the volume manager 144 from the base volume 242. The volume manager 144 also created at least one point-in-time image (not shown) in the snapshot repository 246 per checkpoint volume 240, 248 and 250, as described above with reference to FIGS. 8, 9, 10 and 11.

Data blocks copied to the snapshot repository 246 for the checkpoint volume 240, before the creation of the next checkpoint volumes 248 and 250, relate only to the checkpoint volume 240. After the creation of the checkpoint volume 248, however, and before the creation of the checkpoint volume 250, all data blocks copied to the snapshot repository 246 relate to the checkpoint volume 248 and some relate to the checkpoint volume 240. After the creation of the checkpoint volume 250, all data blocks copied to the snapshot repository 246 relate to the checkpoint volume 250 and some relate to the checkpoint volume 240 or 248 or both.

When the command router 142 (FIG. 2) receives a read request directed to the base volume 242, then the command router 142 calls the base proxy volume 244, which calls the base volume 242 to read the desired data. When the command router 142 receives a write request directed to a target data block (not shown) in the base volume 242, then the command router 142 calls the base proxy volume 244, which determines whether to perform a copy-on-write procedure. The base proxy volume 244 issues a search command to the snapshot repository 246 to search in the newest point-in-time image (not shown) in the snapshot repository 246 to determine whether the target data block has been copied therein. If the target data block is found in the newest point-in-time image in the snapshot repository 246, then a copy-on-write procedure is not necessary. If the target data block is not found in the newest point-in-time image, then it is not necessary to search also in any earlier-created point-in-time images, because regardless of whether the target data block was copied to an earlier-created point-in-time image, the target data block will still have to be copied to the newest point-in-time image, so the newest checkpoint volume 250 will have access to a copy of the target data block. If the checkpoint volumes 240, 248 and 250 did not share the same snapshot repository 246, but had separate snapshot repositories, then searches would have to be performed for the target data block in all of the snapshot repositories. Therefore, the time required to respond to a write request is greatly reduced, since only one snapshot repository 246 has to be searched.

If the command router 142 receives a write request directed to one of the checkpoint volumes 240, 248 or 250, then the command router 142 sends an error message to the requesting host device 104, 106 or 108 (FIG. 1), since data may not be written to the special-case checkpoint volumes, except to copy the data blocks from the base volume 130 (FIG. 1) to the repositories. If the command router 142 receives a read request directed to a target data block (not shown) for one of the checkpoint volumes 240, 248 or 250, then the command router 142 calls the desired checkpoint volume 240, 248 or 250. The desired checkpoint volume 240, 248 or 250 issues a search command to the snapshot repository 246 for the target data block in the initial point-in-time image (not shown) that was created in the snapshot repository 246 at the same time that the desired checkpoint volume 240, 248 or 250 was created. If the target data block is not found in the initial point-in-time image, then the snapshot repository 246 searches through any subsequently created point-in-time images (not shown) in the order in which they were created until the snapshot repository 246 finds the target data block (or the first copy thereof).

The flow of data from a base volume 252 to various snapshot volumes 254, 256 and 258 is shown in FIG. 15 for different states 260, 262, 264 and 266 of the data in the base volume 252 and the snapshot volumes 254, 256 and 258. The state 260 represents the state of the base volume 252 before the creation of any of the snapshot volumes 254, 256 and 258. The state 262 represents the state of the base volume 252 and of the snapshot volume 254, wherein the snapshot volume 254 was formed from the base volume 252, but before the creation of either the snapshot volume 256 or 258. The state 264 represents the state of the base volume 252 and of the snapshot volumes 254 and 256, wherein the snapshot volumes 254 and 256 were both formed from the base volume 252, but snapshot volume 256 was created after snapshot volume 254. Therefore, the state 264 relates to the above discussion with respect to FIG. 12 regarding the situation in which multiple snapshot volumes are formed from the same base volume. The state 266 represents the state of the base volume 252 and of the snapshot volumes 254 and 258, wherein the snapshot volume 254 was formed from the base volume 252, and the snapshot volume 258 was formed from the snapshot volume 254. Therefore, the state 266 relates to the above discussion with respect to FIG. 13 regarding the situation in which a first snapshot volume is formed from a base volume and a second snapshot volume is formed from the first snapshot volume.

At state 260, the base volume 252 contains data (e.g. DATA-A, DATA-B, DATA-C, DATA-D, DATA-E and DATA-F) in data blocks 268, 270, 272, 274, 276 and 278, respectively. The state 260 is the initial state for the examples shown in FIG. 15.

At state 262, the volume manager 144 (FIG. 2) has performed a create snapshot procedure 279 (e.g. the procedure described below with reference to FIG. 17) to create the snapshot volume 254 from the base volume 252 and has created a snapshot repository 280 for the snapshot volume 254. Also, the corresponding base proxy volume (not shown) has copied the data (DATA-A, DATA-B and DATA-E) from three of the data blocks 268, 270 and 276 to a point-in-time image (not shown) in the snapshot repository 280 for the snapshot volume 254. The data (DATA-A, DATA-B and DATA-E) were copied in response to copy-on-write procedures initiated by write requests directed to the base volume 252. In other words, first, the command router 142 received a write request to write DATA-G to data block 270. The command router 142 called the base proxy volume, which copied the DATA-B from data block 270 in the base volume 252 to the data block 282 in the snapshot repository 280 (the first copy-on-write procedure). Then the base proxy volume wrote the DATA-G to the data block 270 in the base volume 252. Second, the command router 142 received a write request to write DATA-H to data block 268. The command router 142 then called the base proxy volume, which copied the DATA-A from data block 268 in the base volume 252 to the data block 284 in the snapshot repository 280 (the second copy-on-write procedure). Then base proxy volume wrote the DATA-H to the data block 268 in the base volume 252. Third, the command router 142 received a write request to write DATA-I to data block 276. The command router 142 then called the base proxy volume, which copied the DATA-E from data block 276 in the base volume 252 to the data block 286 in the snapshot repository 280 (the third copy-on-write procedure). Then the base proxy volume wrote the DATA-I to the data block 276 in the base volume 252.

At state 264, the volume manager 144 (FIG. 2) has performed another create snapshot volume procedure 287 to create the snapshot volume 256 from the base volume 252 and has created a snapshot repository 288 for the snapshot volume 256. Also, the corresponding base proxy volume (not shown) has copied the data (DATA-H, DATA-C and DATA-I) from three of the data blocks 268, 272 and 276 of the base volume 252 to a point-in-time image (not shown) in the snapshot repository 288 for the snapshot volume 256. The base proxy volume (not shown) corresponding to the snapshot volume 254 has also copied the data (DATA-C) from the data block 272 of the base volume 252 to the snapshot repository 280 for the snapshot volume 254.

The command router 142 received a write request to write DATA-J to data block 268. The command router 142 then called the corresponding base proxy volume (not shown), which copied the DATA-H from the data block 268 in the base volume 252 to the data block 290 in the snapshot repository 288. Then the corresponding base proxy volume wrote the DATA-J to the data block 268 in the base volume 252. The DATA-H from the data block 268 did not have to be copied to the snapshot repository 280 because the DATA-A from the same data block 268 had already been copied to the snapshot repository 280 at state 262. Therefore, the DATA-H was not relevant to the state of the base volume 252 at the time of the formation of the snapshot volume 254 and the snapshot repository 280.

The command router 142 (FIG. 2) received a write request to write DATA-K to data block 272. The command router 142 then called the corresponding base proxy volume, which copied the DATA-C from the data block 272 in the base volume 252 to the data block 292 in the snapshot repository 288. Then the base proxy volume (not shown) corresponding to the snapshot volume 254 also copied the DATA-C from the data block 272 to the data block 294 in the snapshot repository 280. Then the DATA-K was written to the data block 272 in the base volume 252. The DATA-C from the data block 272 had to be copied to the snapshot repository 280 as well as to the snapshot repository 288 because the DATA-C had not yet been copied to the snapshot repository 280 at state 262. Therefore, the DATA-C was relevant to the state of the base volume 252 at the time of the formation of the snapshot volume 254 as well as at the time of the formation of the snapshot volume 256.

The command router 142 (FIG. 2) received a write request to write DATA-L to data block 276. The command router 142 then called the base proxy volume (not shown), which copied the DATA-I from the data block 276 in the base volume 252 to the data block 296 in the snapshot repository 288. Then the DATA-L was written to the data block 276 in the base volume 252. The DATA-I from the data block 276 did not have to be copied to the snapshot repository 280 because the DATA-E from the same data block 276 had already been copied to the snapshot repository 280 at state 262. Therefore, the DATA-I was not relevant to the state of the base volume 252 at the time of the formation of the snapshot volume 254 and the snapshot repository 280.

At state 266, the volume manager 144 (FIG. 2) has performed another create snapshot volume procedure 297 to create the snapshot volume 258 from the snapshot volume 254 and has created a snapshot repository 298 for the snapshot volume 258. Also, the base proxy volume (not shown) corresponding to the snapshot volume 258 has copied the data (DATA-B and DATA-E) from two of the data blocks 282 and 286 of the snapshot repository 280 to a point-in-time image (not shown) in the snapshot repository 298 for the snapshot volume 258. The base proxy volume (not shown) corresponding to the snapshot volume 254 has copied the data (DATA-F) from the data block 278 of the base volume 252 to the snapshot repository 280 for the snapshot volume 254. The base proxy volume corresponding to the snapshot volume 254 has also written the data (DATA-M) to the data block 270 of the base volume 252 without copying the previous data (DATA-G) to either snapshot repository 280 or 298.

The command router 142 (FIG. 2) received a write request to write DATA-J to data block 282 of the snapshot repository 280. The command router 142 then passed the write request to the base proxy volume (not shown) corresponding to the snapshot volume 258, which called the snapshot volume 254 to read the DATA-B from the data block 282 in the snapshot repository 280. The snapshot volume 254 passed the DATA-B back to the base proxy volume corresponding to the snapshot volume 258, which wrote the DATA-B to the data block 300 in the snapshot repository 298. Then the base proxy volume corresponding to the snapshot volume 258 passed the write request to the snapshot volume 254, which wrote the DATA-J to the data block 282 in the snapshot repository 280.

The command router 142 received a write request to write DATA-K to data block 286 in the snapshot repository 280. The command router 142 then called the base proxy volume (not shown) corresponding to the snapshot volume 258, which called the snapshot volume 254 as the "base volume" for snapshot volume 258. Snapshot volume 254 read the DATA-E from the data block 286 in the snapshot repository 280 and passed it to the base proxy volume corresponding to the snapshot volume 258, which wrote the DATA-E to the data block 302 in the snapshot repository 298. Then base proxy volume corresponding to the snapshot volume 258 passed the original write request to the snapshot volume 254, which wrote the DATA-K to the data block 286 in the snapshot repository 280.

The command router 142 received a write request to write DATA-L to the data block 278 in the base volume 252. Since the DATA-F had not already been copied from the data block 278 to the snapshot repository 280, when the command router 142 called the base proxy volume (not shown) corresponding to the snapshot volume 254, the base proxy volume copied the DATA-F from the data block 278 in the base volume 252 to the data block 304 in the snapshot repository 280. Then the base proxy volume wrote the DATA-L to the data block 278 in the base volume 252.

The command router 142 received a write request to write DATA-M to the data block 270 in the base volume 252. The DATA-M replaced the DATA-G, which in turn replaced the DATA-B in data block 270 at state 262, which was copied to the data block 282 of the snapshot repository 280 at state 262. In other words, the DATA-G was not relevant to the state of the base volume 252 at the creation of the snapshot volume 254, so there was no need to copy DATA-G to the snapshot repository 280. Therefore, the write request to write DATA-M to the data block 270 in the base volume 252 did not result in a copy-on-write procedure.

The flow of data from a base volume 306 to various checkpoint volumes 308, 310 and 312 is shown in FIG. 16 for different states 314, 316, 318 and 320 of the data in the base volume 306 and the checkpoint volumes 308, 310 and 312. The state 314 represents the state of the base volume 306 before the creation of any of the checkpoint volumes 308, 310 and 312. The state 316 represents the state of the base volume 306 and of the checkpoint volume 308, wherein the checkpoint volume 308 was formed from the base volume 306, but before the creation of either the checkpoint volume 310 or 312. The state 318 represents the state of the base volume 306 and of the checkpoint volumes 308 and 310, wherein the checkpoint volumes 308 and 310 were both formed from the base volume 306, but the checkpoint volume 310 was created after the checkpoint volume 308. The state 320 represents the state of the base volume 306 and of the checkpoint volumes 308, 310 and 312, wherein all of the checkpoint volumes 308, 310 and 312 were formed from the base volume 306, but the checkpoint volume 310 was created after the checkpoint volume 308, and the checkpoint volume 312 was created after the checkpoint volume 310. Therefore, the states 314, 316, 318 and 320 relate to the above discussion with respect to FIG. 14 regarding the situation in which multiple checkpoint volumes are formed from the same base volume.

The base volume 306 begins at state 314 with data (DATA-A, DATA-B, DATA-C, DATA-D, DATA-E and DATA-F) stored in data blocks 322, 324, 326, 328, 330 and 332 of the base volume 306 before the formation of any of the checkpoint volumes 308, 310 and 312. At the time of state 316, the command router 142 (FIG. 2) has copied the data (DATA-B and DATA-E) from the data blocks 324 and 330 of the base volume 306 to data blocks 338 and 340 in a first point-in-time image 342 in the snapshot repository 336. The data (DATA-B and DATA-E) in the data blocks 338 and 340 relate to the checkpoint volume 308.

At the time of state 318, the command router 142 (FIG. 2) has copied the data (DATA-A, DATA-C and DATA-H) from the data blocks 322, 326 and 330, respectively, of the base volume 306 to the data blocks 346, 348 and 350, respectively, of a second point-in-time image 352 in the snapshot repository 336. The data (DATA-A, DATA-C and DATA-H) in the data blocks 346, 348 and 350 in the second point-in-time image 352 relate to the checkpoint volume 310. The data (DATA-A and DATA-C) in the data blocks 346 and 348 in the second point-in-time image 352 and the data (DATA-B and DATA-E) in the data blocks 338 and 340 in the first point-in-time image 342 relate to the checkpoint volume 308.

At the time of state 320, the command router 142 (FIG. 2) has copied the data (DATA-K, DATA-F, DATA-J and DATA-G) from the data blocks 330, 332, 326 and 324, respectively, of the base volume 306 to the data blocks 356, 358, 360 and 362, respectively, of the third point-in-time image 364 in the snapshot repository 336. The data (DATA-K, DATA-F, DATA-J and DATA-G) in the data blocks 356, 358, 360 and 362 in the third point-in-time image 364 relate to the third checkpoint volume 312. The data (DATA-G and DATA-F) in the data blocks 362 and 358 in the third point-in-time image 364 and the data (DATA-A, DATA-C and DATA-H) in the data blocks 346, 348 and 350 in the second point-in-time image 352 relate to the second checkpoint volume 310. The data (DATA-F) in the data block 358 in the third point-in-time image 364, the data (DATA-A and DATA-C) in the data blocks 346 and 348 in the second point-in-time image 352 and the data (DATA-B and DATA-E) in the data blocks 338 and 340 in the first point-in-time image 342 relate to the first checkpoint volume 308.

To arrive at the state 316 from state 314, the volume manager 144 (FIG. 2) and the command router 142 (FIG. 2) perform the following steps. The volume manager 144 performs a procedure 366 to create the checkpoint volume 308 from the base volume 306, to create a snapshot repository 336 for the checkpoint volume 308 and to start the point-in-time image 342 in the snapshot repository 336. The command router 142 then receives a write request to write DATA-G to the data block 324 in the base volume 306. The command router 142 then calls the base proxy volume (not shown), which determines that a copy-on-write procedure needs to occur, so it copies the DATA-B from the data block 324 in the base volume 306 to the data block 338 in the first point-in-time image 342 in the snapshot repository 336. The base proxy volume then writes the DATA-G to the data block 324 in the base volume 306. The command router 142 then receives a write request to write DATA-H to the data block 330 in the base volume 306. The command router 142 then calls the base proxy volume, which determines that another copy-on-write procedure needs to occur, so it copies the DATA-E from the data block 330 in the base volume 306 to the data block 340 in the first point-in-time image 342 in the snapshot repository 336. The base proxy volume then writes the DATA-H to the data block 330 in the base volume 306.

To arrive at the state 318 from state 316, the volume manager 144 (FIG. 2) and the command router 142 (FIG. 2) perform the following steps. The volume manager 144 performs a procedure 368 to create the second checkpoint volume 310 from the base volume 306, but not to create another snapshot repository. Instead, the volume manager 144 calls the snapshot repository 336, which starts the second point-in-time image 352 in the original snapshot repository 336 and stops the first point-in-time image 352. The command router 142 then receives a write request to write the DATA-I to the data block 322 in the base volume 306. Thus, the command router 142 the base proxy volume (not shown), which determines that a copy-on-write procedure needs to occur. The base proxy volume copies the DATA-A from the data block 322 in the base volume 306 to the data block 346 in the second point-in-time image 352 in the snapshot repository 336. The base proxy volume then writes the DATA-I to the data block 322 in the base volume 306. The command router 142 then receives a write request to write the DATA-J to the data block 326 in the base volume 306. Thus, the command router 142 calls the base proxy volume, which determines that another copy-on-write procedure needs to occur. The base proxy volume copies the DATA-C from the data block 326 in the base volume 306 to the data block 348 in the second point-in-time image 352 in the snapshot repository 336. The base proxy volume then writes the DATA-J to the data block 326 in the base volume 306. The command router 142 then receives a write request to write the DATA-K to the data block 330 in the base volume 306. Thus, the command router 142 calls the base proxy volume, which determines that another copy-on-write procedure needs to occur. The base proxy volume copies the DATA-H from the data block 330 in the base volume 306 to the data block 350 in the second point-in-time image 352 in the snapshot repository 336. The base proxy volume then writes the DATA-K to the data block 330 in the base volume 306.

The DATA-A and DATA-C in data blocks 346 and 348 in the second point-in-time image 352 and the DATA-B and DATA-E in the first point-in-time image 342 are related to the first checkpoint volume 308. The DATA-H in the second point-in-time image 352, however, does not relate to the first checkpoint volume 308, but only to the second checkpoint volume 310, along with the DATA-A and DATA-C. The DATA-H was copied from the data block 330 in the base volume 306. The contents of the data block 330, however, were already copied to the snapshot repository 336 upon copying the DATA-E to the first point-in-time image 342. Therefore, since the contents of the data block 330 had already been copied to the snapshot repository 336 on behalf of the first checkpoint volume 308, the subsequent copying of the contents of the data block 330 related to only the second checkpoint volume 310.

To arrive at the state 320 from state 318, the volume manager 144 (FIG. 2) and the command router 142 (FIG. 2) perform the following steps. The volume manager 144 performs a procedure 370 to create the third checkpoint volume 312 from the base volume 306, and again, does not create another snapshot repository. Instead, the volume manager 144 instructs the snapshot repository 336 to start the third point-in-time image 364, effectively stopping the second point-in-time image 352. The command router 142 then receives a write request to write the DATA-L to the data block 330 in the base volume 306. Thus, the command router 142 calls the base proxy volume (not shown), which determines that a copy-on-write procedure needs to occur. The base proxy volume copies the DATA-K from the data block 330 in the base volume 306 to the data block 356 in the third point-in-time image 364 in the snapshot repository 336. The base proxy volume then writes the DATA-L to the data block 330 in the base volume 306. The command router 142 then receives a write request to write the DATA-M to the data block 332 in the base volume 306. Thus, the command router 142 calls the base proxy volume, which determines that a copy-on-write procedure needs to occur. The base proxy volume copies the DATA-F from the data block 332 in the base volume 306 to the data block 358 in the third point-in-time image 364 in the snapshot repository 336. The base proxy volume then writes the DATA-M to the data block 332 in the base volume 306. The command router 142 then receives a write request to write the DATA-N to the data block 326 in the base volume 306. Thus, the command router 142 calls the base proxy volume, which determines that a copy-on-write procedure needs to occur. The base proxy volume copies the DATA-J from the data block 326 in the base volume 306 to the data block 360 in the third point-in-time image 364 in the snapshot repository 336. The base proxy volume then writes the DATA-N to the data block 326 in the base volume 306. The command router 142 then receives a write request to write the DATA-O to the data block 324 in the base volume 306. Thus, the command router 142 calls the base proxy volume, which determines that a copy-on-write procedure needs to occur. The base proxy volume copies the DATA-G from the data block 324 in the base volume 306 to the data block 362 in the third point-in-time image 364 in the snapshot repository 336. The base proxy volume then writes the DATA-O to the data block 324 in the base volume 306.

The DATA-F in data block 358 in the third point-in-time image 364 is related to all three of the checkpoint volumes 308, 310 and 312, since the copying of the DATA-F is the first copying of the contents of the data block 332 in the base volume 306. The DATA-G in data block 362 in the third point-in-time image 364 is related to only the second and third checkpoint volumes 310 and 312, since the contents of data block 324 was copied to the first point-in-time image 342 on behalf of the first checkpoint volume 308 upon copying the DATA-B to data block 338, but was not copied again until after the formation of the third checkpoint volume 312. The DATA-K and DATA-J in the third point-in-time image 364, however, do not relate to either the first or second checkpoint volumes 308 or 310, but only to the third checkpoint volume 312. The DATA-K was copied from the data block 330 in the base volume 306 on behalf of the third checkpoint volume 312 after the contents of the data block 330 had already been copied twice before on behalf of the first and second checkpoint volumes 308 and 310 upon the copying of the DATA-E and the DATA-H, respectively. Therefore, the third copying of the contents of the data block 330 related to only the third checkpoint volume 312. Additionally, the DATA-J was copied from the data block 326 in the base volume 306 on behalf of the third checkpoint volume 312 after the contents of the data block 326 had already been copied once before on behalf of both the first and second checkpoint volumes 308 and 310 upon the copying of the DATA-C. Therefore, the second copying of the contents of the data block 326 related to only the third checkpoint volume 312.

When performing a read request to the checkpoint volume 308 to read data (DATA-C) that had been in data block 326 in the base volume 306 prior to the formation of the checkpoint volume 308, the command router 142 (FIG. 1) passes the read request to the checkpoint volume 308. The checkpoint volume 308 issues a search command to the snapshot repository 336. The snapshot repository 336 searches first in the point-in-time image 342 that corresponds to the creation of the checkpoint volume 308. Since the snapshot repository 336 does not find a data block in the first point-in-time image 342 that relates to the data block 326 in the base volume 306, the snapshot repository 336 proceeds to the second point-in-time image 352. In the second point-in-time image 352, the snapshot repository 336 finds the data block 348, which relates to the data block 326 and which contains the data (DATA-C) that was originally stored in the data block 326 in the base volume 306 prior to the formation of the checkpoint volume 308. The snapshot repository 336 returns the DATA-C to the checkpoint volume 308, which returns the DATA-C to the command routers 142. The command router 142 then returns the DATA-C to the application 112 (FIG. 1) or client device 110 (FIG. 1) that issued the read request. If the snapshot repository 336 had proceeded to the third point-in-time image 364, the snapshot repository 336 would have found the data block 360, which also relates to the data block 326 in the base volume 306. However, since the snapshot repository 336 found the correct data block 348 in the second point-in-time image 352, the snapshot repository 336 stopped searching at that point and did not proceed to the third point-in-time image 364.

A procedure 380 for the volume manager 144 (FIG. 2) to create a new snapshot or checkpoint volume is shown in FIG. 17. The procedure 380 starts at step 382. At step 384, the volume manager 144 receives a command, typically from a host device 104-108 (FIG. 1) under control of a system administrator, to form a snapshot or checkpoint volume from a given "base volume." The given base volume is either an actual base volume, such as base volumes 130

(FIG. 2), 212 (FIG. 12), 228 (FIG. 13) and 242 (FIG. 14), or a snapshot or checkpoint volume. If it is a checkpoint volume that is to be created, as determined at step 386, then at step 388, it is determined whether there is already a corresponding snapshot repository, since the checkpoint volume may share a snapshot repository with an earlier-created checkpoint volume for the same "base volume." If there is not already a snapshot repository, or if it is not a checkpoint volume that is to be created, as determined at step 386, then the snapshot repository is created at step 390 by allocating storage space in the storage devices 103 (FIGS. 1 and 2). After the snapshot repository is created, or if there is already a snapshot repository, as determined at step 388, then the snapshot repository is instructed to create a new point-in-time image at step 392. The snapshot repository creates the point-in-time image at step 394 by allocating storage space within its data section (e.g.-data section 150 shown in FIGS. 3–7 or data section 192 shown in FIGS. 8–11) and returns an identifier for the point-in-time image to the volume manager 144. The corresponding base proxy volume is created at step 396 with parameters that identify the snapshot repository and the given "base volume." The snapshot or checkpoint volume is created at step 398 with parameters that identify the snapshot repository, the given "base volume" and the image identifier. The base proxy volume is inserted between the command router 142 (FIGS. 2, 12, 13 and 14) and the actual base volume 130, 212, 228 or 242 at step 400 by rerouting volume references to include the new base proxy volume. Additionally, a volume reference for the new snapshot or checkpoint volume is sent to the command router 142. The procedure 380 ends at step 402.

A procedure 404 for the command router 142 (FIGS. 2, 12, 13 and 14) to route a data access request to a base volume or snapshot volume is shown in FIG. 18. The procedure 404 starts at step 406. At step 408, a command or data access request is received. Information in the command identifies the base volume or snapshot or checkpoint volume to which the command is directed as shown at step 410. The logical volume to which the command is to be passed is identified at step 412. The logical volume is either a base proxy volume, the base volume if there is no base proxy volume or a snapshot or checkpoint volume. The command is then passed to the identified logical volume at step 414. The logical volume then responds as described below with reference to FIGS. 19–25. The command router 142 receives the response from the logical volume at step 416. The response is then sent to the host device 104-108 that issued the command. The procedure 404 ends at step 420.

Procedures 422 and 424 for a base proxy volume to respond to a data read or write request are shown in FIGS. 19 and 20, respectively. The data read and write requests may be received from the command router 142 (FIGS. 2, 12, 13 and 14) when the command router 142 passes the command at step 414 in FIG. 18, or the data read and write requests may be received from another logical volume, such as a base proxy volume or a snapshot or checkpoint volume.

The base proxy read procedure 422 starts at step 426 in FIG. 19. At step 428, the base proxy volume receives the data read request for a designated "data block" in its "base volume." As mentioned above, a data read request is essentially "passed through" the base proxy volumes down to its "base volume," so at step 430, the base proxy volume issues a data "read" request to its "base volume" for the designated "data block." The "base volume" may be the actual base volume, another base proxy volume or a snapshot or checkpoint volume. When a response is received, the data "read" request at step 430 returns the requested "data block" to the command router 142 or the logical volume that issued the data read request to the base proxy volume. The base proxy read procedure 422 ends at step 432.

The base proxy write procedure 424 starts at step 434 in FIG. 20. At step 436, the base proxy volume receives the data write request directed to a designated "data block" in its "base volume" and accompanied by the "data" to be written to the "data block." Again, the "base volume" may be the actual base volume, another base proxy volume or a snapshot or checkpoint volume. As discussed above, before the base proxy volume can write the "data" to its "base volume," the base proxy volume must determine whether a copy-on-write procedure needs to be performed. To make this determination, the base proxy volume issues a search request to its "snapshot repository" to determine whether the "data block" is present in the "snapshot repository" at step 438, because if the "data block" is present in the "snapshot repository," then there is no need for the copy-on-write procedure. See FIG. 23. At step 440, it is determined whether the search was successful. If so, then the copy-on-write procedure is skipped and the "data" is written to the "data block" in the "base volume" at step 442. If the "data block" is not found (step 440), then the copy-on-write procedure needs to be performed, so the "data block" is read from the "base volume" at step 444, and the "read data" for the "data block" is saved or written to the "snapshot repository" at step 446. After the copying of the "data block" to the "snapshot repository," the "data" is written to the "data block" in the "base volume" at step 442. The base proxy write procedure 424 ends at step 448.

Procedures 450 and 452 for a snapshot or checkpoint volume to respond to a data read or write request are shown in FIGS. 21 and 22, respectively. The data read and write requests may be received from the command router 142 (FIGS. 2, 12, 13 and 14) when the command router 142 passes the command at step 414 in FIG. 18, or the data read and write requests may be received from another logical volume, such as another snapshot or checkpoint volume or a base proxy volume issuing a data read request to its "base volume" at steps 430 (FIG. 19) or 444 (FIG. 20).

The snapshot read procedure 450 begins at step 454 in FIG. 21. At step 456, the snapshot (or checkpoint) volume receives the data read request directed to a designated "data block." The "data block" is in either the "base volume" or "snapshot repository" corresponding to the snapshot volume, so at step 458 a search request is issued to the "snapshot repository" to determine whether the "data block" is present in the "snapshot repository." See FIG. 24 below. For a data read request, the snapshot repository begins its search for the "data block" in the point-in-time image that corresponds to the snapshot volume at the time that the snapshot volume was created and continues in the next later-created point-in-time image until of the "data block" is found or the search reaches the end of the last-created point-in-time image. Thus, the starting point-in-time image for the search is designated by the snapshot volume in the "image identifier" at step 458. The "location in repository" for the "data block" is received from the "snapshot repository" at step 460. If the search was successful, as determined at step 462, based on the returned "location in repository," then the "data block" is read from the "location in repository" in the "snapshot repository" at step 464 and the "data block" is returned to the command router 142 (FIGS. 2, 12, 13 and 14) or the logical volume that issued the data read request to the snapshot volume. If the search was not successful, as determined at step 462, then the "data block"

is read from the "base volume" of the snapshot volume at step 466 and the "data block" is returned to the command router 142 or the logical volume that issued the data read request to the snapshot volume. The snapshot read procedure 450 ends at step 468.

The snapshot write procedure 450 begins at step 470 in FIG. 22. At step 472, the snapshot volume receives the data write request directed to a designated "data block" accompanied by the "data" to be written. If the snapshot volume is a checkpoint volume, as determined at step 474, then an error is returned at step 476 to the command router (FIGS. 2, 12, 13 and 14) or the logical volume that issued the data write request to the snapshot volume, since data may not be written to the checkpoint volumes. If the snapshot volume is not a checkpoint volume, as determined at step 474, then the "data" is saved or written to the "data block" in the "snapshot repository" at step 478. The snapshot write procedure 452 ends at step 480.

Two procedures 482 and 484 for a snapshot repository to search for a "data block" are shown in FIGS. 23 and 24, respectively, and a procedure 486 for the snapshot repository to save "data" to a "data block" in the snapshot repository is shown in FIG. 25. Commands for searching or saving by the snapshot repository are received from either a corresponding base proxy volume or a corresponding snapshot or checkpoint volume. There are two search procedures 482 and 484 because one (procedure 482) returns only a success/fail response for whether the data block was found in the snapshot repository, whereas the other (procedure 484) returns the location in the snapshot repository for the data block. Different procedures require one or the other result of the search procedures 482 and 484. For example, the base proxy write procedure 424 (FIG. 20) only needs to know whether the "data block" is present in the snapshot repository in order to determine whether to perform a copy-on-write procedure. The snapshot read procedure 450 (FIG. 21), however, needs to know the location in the repository for the data block, so the snapshot read procedure 450 can read the data block from that location.

The first repository search procedure 482 begins at step 488. At step 490, the snapshot repository receives the search command to determine whether the "data block" is present in the snapshot repository. The search command was sent, for example, by the base proxy volume at step 438 in the base proxy write procedure 424 shown in FIG. 20. The first repository search procedure 482 then calls the second repository search procedure 484 (FIG. 24) at step 492, since the second repository search procedure 484 has the software code for scanning the snapshot repository and locating the "data block." By using the second repository search procedure 484, the software code for the first repository search procedure 482 is simplified. The "data block" and the "image identifier" (obtained at step 398, FIG. 17) for the newest point-in-time image in the snapshot repository are passed as parameters to the second repository search procedure 484. After the second repository search procedure 484 searches for the "data block," as described below, the "location in repository" generated by the second repository search procedure 484 is received at step 494. If the second repository search procedure 484 resulted in finding the "data block," as determined by the value of the "location in repository" at step 496, then the first repository search procedure 482 returns a signal (step 498) indicating that the search was successful to the base proxy volume or snapshot or checkpoint volume that called the first repository search procedure 482. If the second repository search procedure 484 failed to find the "data block," as determined by the value of the "location in repository" at step 496, then the first repository search procedure 482 returns a signal (step 500) indicating that the search failed to the base proxy volume or snapshot or checkpoint volume that called the first repository search procedure 482. The first repository search procedure 482 ends at step 502.

The second repository search procedure 484 begins at step 504. At step 506, the snapshot repository receives the search command to find the location of the "data block" in the snapshot repository given the "image identifier" of the point-in-time image in the snapshot repository in which to begin searching. The search command was sent, for example, by the snapshot repository to itself at step 492 in the first repository search procedure 482 shown in FIG. 23 or by a snapshot volume at step 458 in the snapshot read procedure 450 shown in FIG. 21. The "image identifier" was generated at step 398 in the procedure 380 for the volume manager 144 (FIG. 2) to create a new snapshot or checkpoint volume shown in FIG. 17. The directory of the point-in-time image corresponding to the "image identifier" is scanned at step 508 using the "data block" as a key for the scan. If the "data block" is not found in the point-in-time image, as determined at step 510, then it is determined at step 512 whether there is a next newer point-in-time image. If so, then the next newer point-in-time image is selected at step 514, and the step 508 is repeated to scan the newer point-in-time image directory for the "data block." If the "data block" is not found (step 510), and there is no newer point-in-time image that can be scanned (step 512), then the second repository search procedure 484 returns a zero value for the "location in repository" at step 516 to the procedure (e.g. 450 in FIG. 21 or 482 in FIG. 23) that called the second repository search procedure 484. The zero value indicates a failure to find the "data block" in the snapshot repository. If it is determined at step 510 that the "data block" has been found, then the location in the snapshot repository at which the "data block" was found in the scan at step 508 is returned at step 518 to the procedure that called the second repository search procedure 484. The second repository search procedure 484 ends at step 520.

The repository save procedure 486 starts at step 522 in FIG. 25. At step 524, the snapshot repository receives the command to save the given "data" to the target "data block." The command may be sent by the base proxy volume at step 446 in the base proxy write procedure 424 shown in FIG. 20 or by the snapshot volume at step 478 in the snapshot write procedure 452 shown in FIG. 22. If the "data block" is already present in the snapshot repository, typically copied from the corresponding base volume, then the new "data" must be saved to the same location in the snapshot repository. Therefore, the second repository search procedure 484 (FIG. 24) is called at step 526 to determine the location in the snapshot repository for the "data block." Only the newest point-in-time image, as specified by the "image identifier" needs to be searched for the "data block." The "location in repository" is received from the second repository search procedure 484 at step 528. If the search was successful, as determined at step 530 from the "location in repository," then the "data" is written to the "location in repository" of the snapshot repository at step 532. If the search was not successful, as determined at step 530, then the next available location in the newest point-in-time image of the snapshot repository is allocated for the "data block" at step 534. The "data block" and its "location in repository" are added to the newest point-in-time image's directory at step 536. Then, at step 532, the "data" is written to the newly allocated "location in repository" in the snapshot repository. The repository save procedure 486 ends at step 538.

The above described invention has the advantage of saving storage space in the storage arrays 114, 116 and 118 (FIG. 1), particularly for the special-case checkpoint volumes, which share a single snapshot repository and the point-in-time images stored therein. The invention also has the advantage of being more efficient in performing data access requests, since in some circumstances, only one snapshot repository and one point-in-time image within the snapshot repository needs to be searched for the relevant data block. Additionally, only one copy-on-write procedure needs to be performed for multiple checkpoint volumes. When a checkpoint volume is deleted, any point-in-time image that relates only to that checkpoint volume is also deleted, so that storage space within the snapshot repository may be reused for subsequent point-in-time images. Additionally, with only one snapshot repository, the volume manager 144 (FIG. 1) has only one area of storage space to manage, which can be reserved ahead of time.

Presently preferred embodiments of the invention and its improvements have been described with a degree of particularity. This description has been made by way of preferred example. It should be understood that the scope of the present invention is defined by the following claims, and should not be unnecessarily limited by the detailed description of the preferred embodiments set forth above.

The invention claimed is:

1. A method of managing a snapshot volume and a base volume for data storage in a computer storage device, wherein the snapshot volume is formed from the base volume using a single snapshot repository, the base volume storing first data in base data blocks before the snapshot volume is created and storing second data in the base data blocks after the snapshot volume is created, the snapshot volume representing a state of the first data in the base volume at a point in time when the snapshot volume is created, the snapshot repository containing repository data blocks and the snapshot repository storing in the repository data blocks the first data copied from the base volume upon storing the second data in the base volume, the method comprising the steps of:

creating the snapshot volume at a first point in time;

forming the snapshot repository;

starting a first image in the snapshot repository at the first point in time, the first image containing the repository data blocks;

linking the snapshot volume to the base volume and to the first image in the snapshot repository, the base data blocks in the base volume containing portions of the first data that have not been copied to the snapshot repository and the repository data blocks in the snapshot repository containing portions of the first data that have been copied to the snapshot repository;

starting a second image in the snapshot repository at a second point in time, the second image containing the repository data blocks that contain the first data copied from the base volume after starting the second image, the starting of the second image effectively stopping the first image in the snapshot repository at the second point in time; and linking the snapshot volume also to the second image in the snapshot repository.

2. A method as defined in claim 1, wherein a command router program handles data access requests that are directed to the base volume and to the snapshot volume, comprising the further steps of:

forming a base proxy volume related to the base volume, the snapshot volume and the snapshot repository and containing information and software to handle data access requests directed to the base volume;

linking the base proxy volume to the base volume and to the snapshot repository;

receiving at the command router program a data access request directed to the base volume;

passing by the command router program the data access request to the base proxy volume;

accessing the snapshot repository when the base proxy volume determines that the data access request requires access to the snapshot repository; and accessing the base volume by the base proxy volume to satisfy the data access request.

3. A method as defined in claim 1, wherein the snapshot repository includes a predetermined extent of data storage space in the computer storage device, the extent having a beginning and an end location, a portion of the data storage space being currently unused for data storage, comprising the further steps of:

increasing the first image to the end location of the extent of the snapshot repository;

stopping the first image upon reaching the end location of the extent of the snapshot repository; and starting the second image at a point in the unused portion of the data storage space that is nearest the beginning location of the extent of the data storage space.

4. A method as defined in claim 1, wherein the aforesaid snapshot volume is a first snapshot volume, comprising the further steps of:

creating a second snapshot volume at the second point in time; and linking the second snapshot volume to the second image in the snapshot repository.

5. A method of managing first and second checkpoint volumes and a base volume for data storage in a computer storage device, wherein the first and second checkpoint volumes are formed from the base volume using a single snapshot repository, the base volume storing first data in base data blocks before the first checkpoint volume is created, the base volume storing second data in the base data blocks after the first checkpoint volume is created and before the second checkpoint volume is created, the base volume storing third data in the base data blocks after the second checkpoint volume is created, the first checkpoint volume representing a first data state of the base volume at a point in time when the first checkpoint volume is created, the second checkpoint volume representing a second data state of the base volume at a point in time when the second checkpoint volume is created, the snapshot repository containing repository data blocks, the snapshot repository storing in the repository data blocks the first data copied from the base volume upon storing the second or third data in the base volume and the snapshot repository storing in the repository data blocks the second data copied from the base volume upon storing the third data in the base volume, the method comprising the steps of:

creating the first checkpoint volume at a first point in time;

forming the snapshot repository at the first point in time;

starting a first image in the snapshot repository at the first point in time, the first image containing the repository data blocks;

linking the first checkpoint volume to the base volume and to the first image in the snapshot repository;

creating the second checkpoint volume at a second point in time after the first point in time;

starting a second image in the snapshot repository at the second point in time, the second image containing the repository data blocks that contain the first and second data copied from the base volume after starting the second image, the starting of the second image effectively stopping the first image in the snapshot repository at the second point in time;

linking the second checkpoint volume to the base volume and to the second image in the snapshot repository; and linking the first checkpoint volume also to the second image in the snapshot repository.

6. A method as defined in claim 5, wherein a command router program handles data access requests that are directed to the base volume and to the first and second checkpoint volumes, comprising the further steps of:

receiving at the command router program a data write request to write the third data to a predetermined one of the base data blocks that contains the first data in the base volume;

copying the first data from the predetermined one of the base data blocks to a predetermined one of the repository data blocks in the second image;

writing the third data to the predetermined one of the base data blocks in the base volume; and relating the first data to the first and second checkpoint volumes.

7. A method as defined in claim 6, wherein the aforesaid predetermined one of the base data blocks is a first predetermined one of the base data blocks, and the aforesaid predetermined one of the repository data blocks is a first predetermined one of the repository data blocks, comprising the further steps of:

receiving at the command router program a data write request to write the third data to a second predetermined one of the base data blocks that contains the second data in the base volume;

copying the second data from the second predetermined one of the base data blocks to a second predetermined one of the repository data blocks in the second image;

writing the third data to the second predetermined one of the base data blocks in the base volume; and relating the second data to the second checkpoint volume.

8. A method as defined in claim 5 comprising the further steps of:

deleting the first checkpoint volume at a third point in time after the second point in time;

deleting the first image at the third point in time; and maintaining the second checkpoint volume and the second image.

9. A method as defined in claim 5 comprising the further steps of:

deleting the second checkpoint volume at a third point in time after the second point in time; and maintaining the first checkpoint volume and the first and second images.

10. A method as defined in claim 5, wherein a command router program handles data access requests that are directed to the base volume and to the first and second checkpoint volumes, comprising the further steps of:

receiving at the command router program a data write request to write the third data to a predetermined one of the base data blocks that contains the second data in the base volume;

copying the second data from the predetermined one of the base data blocks to a predetermined one of the repository data blocks in the second image;

writing the third data to the predetermined one of the base data blocks in the base volume; and relating the second data to the second checkpoint volume.

11. An improved computer data storage system including a storage device, the storage device containing a base volume, a snapshot volume and a snapshot repository, the base volume including a plurality of base data blocks, the base data blocks containing first computer data before the snapshot volume is created and containing the first computer data and second computer data after the snapshot volume is created, the snapshot repository including a plurality of repository data blocks, the repository data blocks containing the first computer data after the snapshot volume is created, the snapshot volume containing information associating the snapshot volume with the base volume and the snapshot repository, the improvement comprising:

a plurality of images contained within the snapshot repository;

each of the images being associated with the snapshot volume;

each of the images containing at least one of the repository data blocks;

each of the repository data blocks in each of the images containing a portion of the first computer data copied from a corresponding one of the base data blocks in the base volume upon writing the second computer data to the corresponding one of the base data blocks;

each of the images being started at different points in time;

each of the images being stopped upon starting a next subsequent one of the images; and each of the images having the first computer data added thereto until stopped.

12. An improved computer data storage system as defined in claim 11, wherein the aforesaid snapshot volume is a first checkpoint volume formed at a first point in time, the improved computer data storage system further including a second checkpoint volume formed at a second point in time after the first point in time, the base data blocks containing the first computer data, the second computer data and third computer data after the second checkpoint volume is created, wherein:

a first portion of the plurality of images is associated with only the first checkpoint volume;

a second portion of the plurality of images is associated with both the first and second checkpoint volumes;

each repository data block contained in the first portion of the plurality of images is associated with the first checkpoint volume and contains a first portion of the first computer data copied to the first portion of the plurality of images upon being replaced by the second computer data in the base data blocks;

a first portion of the repository data blocks contained in the second portion of the plurality of images contains a second portion of the first computer data copied to the second portion of the plurality of images upon being replaced by the second computer data in the base data blocks;

a second portion of the repository data blocks contained in the second portion of the plurality of images contains a portion of the second computer data copied to the second portion of the plurality of images upon being replaced by the third computer data in the base data blocks;

each repository data block contained in the second portion of the plurality of images that contains the portions of the second computer data is associated with the second checkpoint volume; and each repository data block contained in the second portion of the plurality of images that contains the second portion of the first computer data is associated with both the first and the second checkpoint volumes.

13. An improved computer data storage system as defined in claim 11 further including a command router program that handles data access requests that are directed to the base volume and to the snapshot volume, the improvement further comprising:

a base proxy volume contained within the storage device and associated with the base volume, the snapshot volume and the snapshot repository;

the base proxy volume containing information and software to handle data access requests directed to the base volume, the information and software including directions to access the base volume or the snapshot repository in order to process the data access request.

\* \* \* \* \*